US010409851B2

(12) United States Patent
Huang et al.

(10) Patent No.: US 10,409,851 B2
(45) Date of Patent: Sep. 10, 2019

(54) GESTURE-BASED SEARCH

(75) Inventors: Xuedong David Huang, Bellevue, WA (US); Qing (Alex) Lu, Redmond, WA (US); Zhaowei (Charlie) Jiang, Palo Alto, CA (US); Vikas Rajvanshy, Clyde Hill, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 208 days.

(21) Appl. No.: 13/017,335

(22) Filed: Jan. 31, 2011

(65) Prior Publication Data

US 2012/0197857 A1    Aug. 2, 2012

(51) Int. Cl.
    G06F 17/30    (2006.01)
    G06F 16/435   (2019.01)
    G06F 3/0488   (2013.01)
    G06F 3/01     (2006.01)
    G06F 3/0481   (2013.01)

(52) U.S. Cl.
    CPC ............ *G06F 16/436* (2019.01); *G06F 3/017* (2013.01); *G06F 3/0488* (2013.01); *G06F 3/04812* (2013.01)

(58) Field of Classification Search
    CPC .... G06F 3/017; G06F 3/04812; G06F 3/0488; G06F 17/30032; G06F 16/436
    USPC ........................................................ 707/706
    See application file for complete search history.

(56) References Cited

U.S. PATENT DOCUMENTS

| | | | |
|---|---|---|---|
| 5,252,951 A | 10/1993 | Tannenbaum et al. | |
| 6,598,072 B1 | 7/2003 | McBrearty et al. | |
| 6,968,333 B2 | 11/2005 | Abbott et al. | |
| 7,355,620 B2 | 4/2008 | Ikehata et al. | |
| 7,487,461 B2 | 2/2009 | Zhai et al. | |
| 7,499,003 B2 | 3/2009 | Rudolph et al. | |
| 7,657,518 B2 | 2/2010 | Budzik et al. | |
| 7,856,441 B1 | 12/2010 | Kraft et al. | |
| 7,877,707 B2 | 1/2011 | Westerman et al. | |
| 8,407,606 B1 | 3/2013 | Davidson et al. | |

(Continued)

FOREIGN PATENT DOCUMENTS

| | | |
|---|---|---|
| CN | 102024064 A | 4/2011 |
| KR | 20000063555 A | 11/2000 |

(Continued)

OTHER PUBLICATIONS

Internet Explorer 8: Features, "Accelerators", retrieved on Mar. 7, 2011 at «http://www.microsoft.com/windows/internet-explorer/features/faster.aspx», 3 pages.

(Continued)

*Primary Examiner* — Huawen A Peng
(74) *Attorney, Agent, or Firm* — Schwegman Lundberg & Woessner, P.A.

(57) ABSTRACT

A search of displayed content may be automatically performed in response to receipt of a search gesture that defines a scope of the search and initiates the search. The search gesture may define a region of content within the displayed content. A search query may be formulated based on the region of content defined by the search gesture. In response to completion of the search gesture, a search may be automatically initiated. In some examples, the search gesture comprises a generally circular gesture that substantially bounds the region of content.

35 Claims, 14 Drawing Sheets

(56) References Cited

U.S. PATENT DOCUMENTS

| | | | |
|---|---|---|---|
| 8,438,473 | B2 | 5/2013 | Mak et al. |
| 2003/0142081 | A1 | 7/2003 | Iizuka et al. |
| 2004/0017355 | A1 | 1/2004 | Shim |
| 2005/0057509 | A1 | 3/2005 | Mallett et al. |
| 2005/0154723 | A1 | 7/2005 | Liang |
| 2005/0212766 | A1 | 9/2005 | Reinhardt et al. |
| 2006/0101354 | A1 | 5/2006 | Hashimoto et al. |
| 2006/0136406 | A1 | 6/2006 | Reponen |
| 2006/0253793 | A1* | 11/2006 | Zhai et al. ............ 715/773 |
| 2006/0284852 | A1 | 12/2006 | Hofmeister et al. |
| 2007/0247435 | A1 | 10/2007 | Benko et al. |
| 2008/0005074 | A1 | 1/2008 | Flake et al. |
| 2008/0040323 | A1 | 2/2008 | Joshi |
| 2008/0074391 | A1 | 3/2008 | Coe |
| 2008/0122796 | A1 | 5/2008 | Jobs et al. |
| 2008/0250012 | A1* | 10/2008 | Hinckley et al. ............ 707/5 |
| 2008/0263142 | A1 | 10/2008 | Glass et al. |
| 2009/0003658 | A1 | 1/2009 | Zhang et al. |
| 2009/0006343 | A1 | 1/2009 | Platt et al. |
| 2009/0059730 | A1 | 3/2009 | Lyons et al. |
| 2009/0106221 | A1 | 4/2009 | Meyerzon et al. |
| 2009/0167705 | A1 | 7/2009 | Chen |
| 2009/0228792 | A1 | 9/2009 | van Os et al. |
| 2009/0228825 | A1 | 9/2009 | Van Os et al. |
| 2009/0259643 | A1 | 10/2009 | Peng et al. |
| 2009/0259969 | A1 | 10/2009 | Pallakoff |
| 2009/0278806 | A1 | 11/2009 | Duarte et al. |
| 2009/0287626 | A1 | 11/2009 | Paek et al. |
| 2009/0287657 | A1 | 11/2009 | Bennett |
| 2009/0288044 | A1 | 11/2009 | Matthews et al. |
| 2009/0307205 | A1* | 12/2009 | Churchill .......... G06F 17/30867 |
| 2010/0042935 | A1 | 2/2010 | Malden et al. |
| 2010/0057714 | A1 | 3/2010 | Miedema |
| 2010/0083155 | A1 | 4/2010 | Farago et al. |
| 2010/0105370 | A1 | 4/2010 | Kruzeniski et al. |
| 2010/0146012 | A1 | 6/2010 | Beaudreau et al. |
| 2010/0229125 | A1 | 9/2010 | Cha |
| 2010/0231533 | A1 | 9/2010 | Chaudhri |
| 2010/0241663 | A1 | 9/2010 | Huang et al. |
| 2010/0245263 | A1 | 9/2010 | Parada, Jr. et al. |
| 2010/0302172 | A1 | 12/2010 | Wilairat |
| 2011/0055753 | A1 | 3/2011 | Horodezky et al. |
| 2011/0072033 | A1 | 3/2011 | White et al. |
| 2011/0145232 | A1 | 6/2011 | Chang et al. |
| 2011/0161311 | A1 | 6/2011 | Mishne et al. |
| 2011/0161852 | A1 | 6/2011 | Vainio et al. |
| 2011/0179021 | A1 | 7/2011 | Wen et al. |
| 2011/0179024 | A1 | 7/2011 | Stiver et al. |
| 2011/0208730 | A1 | 8/2011 | Jiang et al. |
| 2012/0044179 | A1 | 2/2012 | Hudson |
| 2012/0131019 | A1 | 5/2012 | Sugiura |
| 2013/0006957 | A1 | 1/2013 | Huang et al. |
| 2014/0223381 | A1 | 8/2014 | Huang et al. |

FOREIGN PATENT DOCUMENTS

| | | |
|---|---|---|
| KR | 20010103532 A | 11/2001 |
| KR | 20060021722 A | 3/2006 |
| KR | 20080098732 A | 11/2008 |
| WO | WO2006137993 A2 | 12/2006 |
| WO | WO2008/002638 A1 | 1/2008 |
| WO | WO2010/065195 A1 | 6/2010 |
| WO | 2010077235 A1 | 7/2010 |
| WO | WO2011024585 | 3/2011 |
| WO | WO2011024585 A1 | 3/2011 |

OTHER PUBLICATIONS

Yahoo! Sketch-a-Search, retrieved on Mar. 7, 2011 at «http://itunes.apple.com/us/app/yahoo-sketch-a-search/id361077521?mt=8», 3 pages.

Aula, "Query Formulation in Web Information Search," «http://www.iadis.net/dl/final_uploads/200302L052.pdf», IADIS International Conference WWW/Internet 2003, vol. I, 8 pages.

HotPads Daily, "Launching 2011 with Hand-Drawn Housing Search," retrieved on Sep. 6, 2011 at «http://daily.hotpads.com/hotpads_daily/2011/01/launching-2011-with-hand-d . . . », Jan. 3, 2011, 3 pages.

Lasso Search—HotPads.com, retrieved on Sep. 6, 2011, at «http://hotpads.com/pages/features/lassoSearch.htm», 3 pages.

McArthur et al., "The Ranking of Query Refinements in Interactive Web-based Retrieval," «http://citeseerx.ist.psu.edu/viewdoc/download?doi=10.1.1.33.1493&rep=rep1&type=pdf», Information Doors Workshop, 2000, 4 pages.

Schaal, "Is HotPads Lasso Search an alternative to Google Hotel Finder shape drawing?" retrieved on Sep. 6, 2011 at «http://www.tnooz.com/2011/08/08/news/is-hotpads-lasso-search-an-alternativ . . . », Aug. 8, 2011, 6 pages.

Yang et al., "A Web Interface for Visualizing Web Search Engine Results," 3rd International Conference on Parallel and Distributed Computing, Applications, and Techniques (PDCAT 2002), 6 pages.

Bounding box, radius, and polygon search—Retrieved Date: Oct. 25, 2010 at «http://msdn.microsoft.com/en-us/library/cc451895.aspx», 11 pages.

Google's gesture search available for android 1.6—Published Date: Mar. 17, 2010, retrieved at «http://blog.itechtalk.com/2010/googles-gesture-search-available-for-android-1-6», 5 pages.

Moustakas, et al., "Master-Piece: A Multimodal (Gesture+Speech) Interface for 3D Model Search and Retrieval Integrated in a Virtual Assembly Application", Published Date: Aug. 2005, 14 pages.

Nudelman, "Design Patterns for Mobile Faceted Search: Part I", Published Date: Apr. 5, 2010, retrieved at «http://www.uxmatters.com/mt/archives/2010/04/design-patterns-for-mobile-faceted-search-part-i.php», 9 pages.

Reimagining mobile search: introducing Yahoo!(R) Sketch-a-Search (TM) and yahoo! search for the iPhone(R) Published Date: Mar. 23, 2010, retrieved at «http://ymobileblog.com/blog/2010/03/23/reimagining-mobile-search-introducing-yahoo%C2%AE-sketch-a-search%E2%84%A2-and-yahoo-search-for-the-iphone%C2%AE-2/», 6 pages.

Yahoo search circle allows users to easily expand & narrow results on map—Published Date: Apr. 24, 2008, retrieved at «http://searchengineland.com/yahoo-search-circle-allows-users-to-easily-expand-narrow-results-on-map-13854», 12 pages.

International Search Report dated May 15, 2013 for PCT/US2013/024247, 10 pages.

Office action for U.S. Appl. No. 13/408,853, dated Feb. 6, 2013, Bai et al., "Context-based Search Query Formation," 19 pages.

Office action for U.S. Appl. No. 13/408,853, dated Jul. 31, 2013, Bai et al., "Context-based Search Query Formation," 21 pages.

European Office Action dated Oct. 21, 2014 for European patent application No. 11866113.1, a counterpart foreign application of U.S. Appl. No. 13/201,823, 5 pages.

Supplementary European Search Report dated Oct. 6, 2014 for European patent application No. 11866113.1, 3 pages.

Office Action for U.S. Appl. No. 13/201,823, dated Jul. 17, 2014, Xuedong Huang, "Invisible Control," 35 pages.

European Office Action dated Jan. 22, 2015 for European patent application No. 13755014.1, a counterpart foreign application of U.S. Appl. No. 13/408,853, 5 pages.

Supplementary European Search Report dated Jan. 14, 2015 for European Patent Application No. 13755014.1, 3 pages.

Office Action for U.S. Appl. No. 13/201,823, dated Jan. 9, 2015, Xuedong Huang, "Invisible Control," 41 pages.

Office action for U.S. Appl. No. 13/201,823, dated May 21, 2015, Huang et al., "Invisible Control", 40 pages.

Office action for U.S. Appl. No. 13/201,823, dated Oct. 27, 2015, Huang et al., "Invisible Control," 42 pages.

"European Search Report Issued in European Patent Application No. 11872811.2", dated Aug. 19, 2015, 7 Pages.

"Final Office Action Issued in U.S. Appl. No. 13/609,729", dated Apr. 23, 2018, 23 Pages.

"Final Office Action Issued in U.S. Appl. No. 13/609,729", dated Jun. 25, 2015, 19 Pages.

"Final Office Action Issued in U.S. Appl. No. 13/609,729", dated Apr. 19, 2017, 27 Pages.

"Non Final Office Action Issued in U.S. Appl. 13/609,729", dated Sep. 28, 2017, 20 Pages.

(56) References Cited

OTHER PUBLICATIONS

"Non Final Office Action Issued in U.S. Appl. 13/609,729", dated Aug. 24, 2018, 35 Pages.
"Non Final Office Action Issued in U.S. Appl. No. 13/609,729", dated May 19, 2016, 23 Pages.
"Non Final Office Action Issued in U.S. Appl. No. 13/609,729", dated Nov. 14, 2014, 16 Pages.
"First Office Action and Search Report Issued in Chinese Patent Application No. 201180073610.9", dated Jul. 4, 2016, 19 Pages.
"Office Action Issued in Chinese Patent Application No. 201180073610.9", dated Jul. 5, 2017, 16 Pages.
"Second Office Action Issued in Chinese Patent Application No. 201180073610.9", dated Mar. 21, 2017, 17 Pages.
"Third Office Action Issued in Chinese Patent Application No. 201180073610.9", dated Dec. 25, 2017, 6 Pages.
Li, Yang, "Gesture Search: A Tool for Fast Mobile Data Access", In Proceedings of the 23rd Annual ACM symposium on User interface software and technology, Oct. 3, 2010, pp. 87-96.
"International Search Report and Written Opinion Issued in PCT Application No. PCT/CN2011/79926", dated May 31, 2012, 10 Pages.
"Final Office Action Issued in U.S. Appl. No. 13/609,729", dated Mar. 1, 2019, 23 Pages.

\* cited by examiner

GESTURE-BASED SEARCH

SUMMARY

This summary introduces simplified concepts of gesture-based searching, which is further described below in the Detailed Description. This summary is not intended to identify essential features of the claimed subject matter, nor is it intended for use in limiting the scope of the claimed subject matter.

This application describes example embodiments of performing a search based on a search gesture. In other embodiments, other actions may be performed based on other predefined gestures.

In one example embodiment, a user may be performing a task on a client device, such as a mobile phone. As part of the task, the client device may display some content, such as a web page, an email, a word processing document, a spreadsheet document, a picture, a map, a user interface of a media player, a viewfinder of a camera, a calendar, a social networking site, a contact, an interface of a game, or the like. The user may perform a search on all or a portion of the displayed content simply by making a search gesture. The client device detects the search gesture, and initiates a search in response to completion of the search gesture. In some implementations, the search gesture defines a region of content, and the client device formulates a search query based on the region of content defined by the search gesture. In other implementations, the search query may be formulated based on subject matter from the region of content and/or context information indicating a context in which the subject matter is presented. The search gesture may be, for example, a touch gesture on a touch screen or touch pad of the client device, a body motion detected by an image capture device of the client device, motion of a cursor controlled by a mouse or other user input device, and/or a motion of the client device itself. In an event that the search gesture includes a gesture other than or in addition to a motion of the client device, a region of content may be defined by the search gesture, and may include, for example, a region that is substantially bounded by the search gesture (e.g., a generally circular gesture) or a region that is touched or overlapped by the search gesture.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

FIG. 5 is a schematic diagram of an example process of moving or panning the representation of the search gesture of FIG. 3.

FIG. 6 is a schematic diagram of an example process of performing an additional search gesture.

FIG. 8 is a schematic diagram of an example expanded search results window.

FIG. 11 is a schematic diagram of an example process of hiding/minimizing a search results window.

FIGS. 12A-12E illustrate example search gestures for performing a search.

DETAILED DESCRIPTION

Overview

Figure 1:
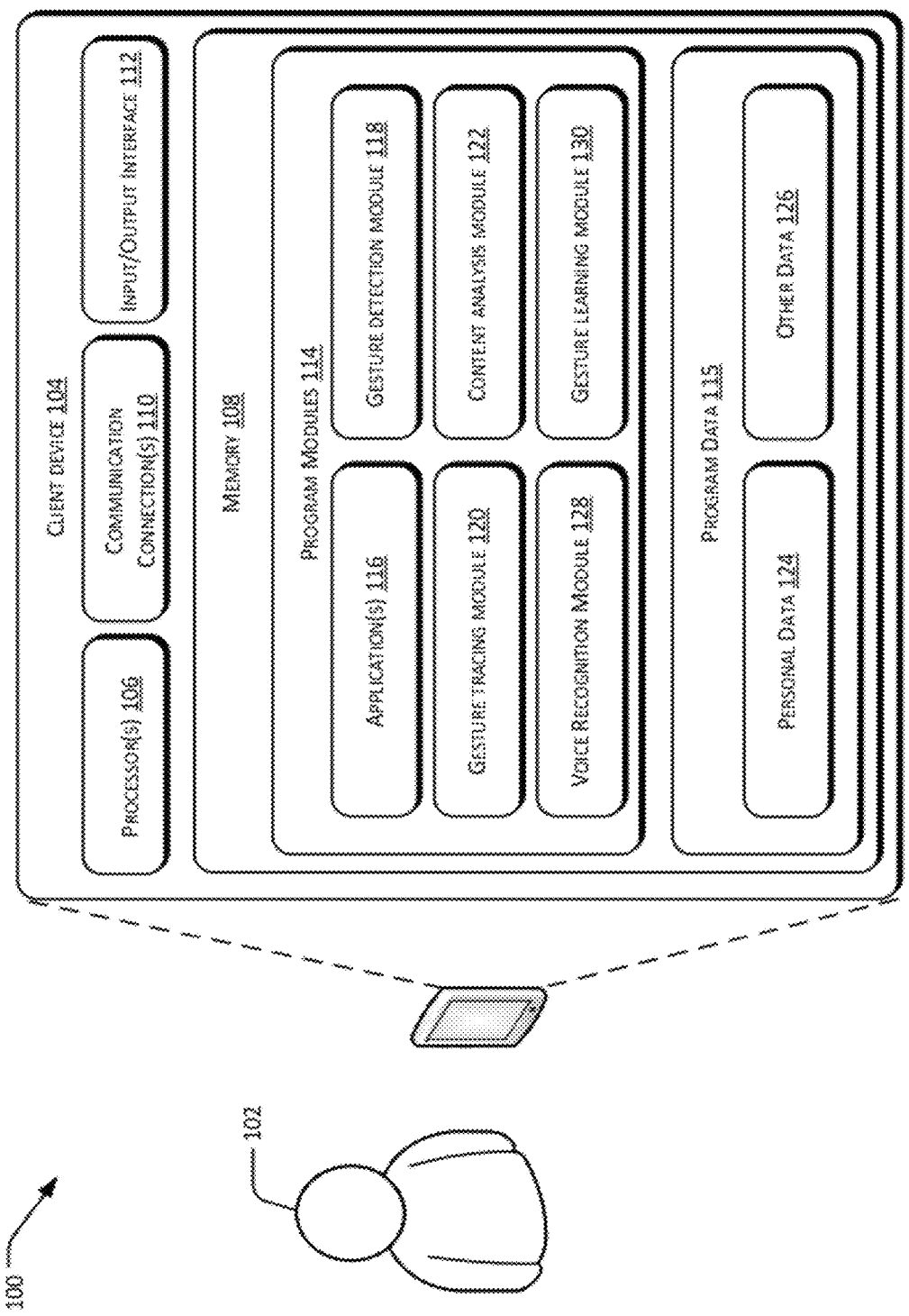
FIG. 1 is a schematic diagram of an exemplary environment including a client device usable to implement gesture-based search.

Typically, when a user wants to search for certain information related to a task the user is performing (e.g., browsing the web, reading an email, working on a word processing document, etc.), the user opens a web browser or a separate window in the web browser, and connects with a search service. Alternatively, the user may query a search engine by entering a search query. The user may enter the search query via a search box which is integrated with a web browser or run with the web browser as a toolbar, or through a separate application that uses the web browser as a platform to complete a search. In either case, the user manually enters the search query, either by typing or by cutting and pasting the search query from the task he/she was previously working on. Other existing technologies may allow a user to input a search query by activating a voice recognition function of the user's device, if available, to input voice commands and/or voice inputs, which are converted into text by a search application of the user's device or the search service. In other existing technologies, the user's device, e.g., a mobile phone, may gather information such as a photograph, global positioning satellite (GPS) data and/or other location information to formulate or refine the search query.

In response to receiving the search query, the search service may return and present search results to the user on a results page. If the user wants to modify the search, the user may enter a modified search query into the text box and submit the modified search query to the search engine, which then returns new search results to the user. Once the user finds the desired information, he or she then exits the search service and returns to the task he/she was originally performing. Should the user need to refer to the search results or perform another search, the user must switch back and forth between his/her original task and the search service, thus disrupting his or her workflow.

The situation becomes even worse if a device used by the user has limited capability or no capability of running multiple applications simultaneously. These problems are especially disruptive on mobile devices, which often do not allow a user to simultaneously view the search results and the original task.

For example, a user may receive a text message from a friend who invites the user to meet at a restaurant. The user may not know the location of the restaurant, and therefore may search for the location of the restaurant. The user may, for example, open a web browser, go to a web page hosted by a search engine, enter a query including the name of the restaurant in a search box provided by the web page and submit the query to the search engine. Alternatively, the user may input the name of the restaurant to a search application through voice commands and/or voice inputs. Given a small display, lack of a physical keyboard and/or voice recognition capability of the mobile device, however, the user may find it difficult to perform this search process. The situation may become even worse if the name of the restaurant is long or complicated, such that the user may need to go back and forth between the text message and the web page in order to enter the correct name of the restaurant.

In another example, a user may be reading a web page that includes an image using a mobile device. The user may want to conduct a search for the image. To conduct the search, the user may need to know how to describe the image and provide a textual description of the image to a search engine, similar to the search process described above. Alternatively, the user may first save the image to local memory of the mobile device and then upload the image to a search engine that allows content-based image retrieval. In both cases however, the user is required to go through a number of steps in order to perform the image search. Furthermore, some mobile devices such as mobile phones having limited memory and/or functional capabilities may not allow storage of an image from the Internet into the mobile device or may require cumbersome procedures to do so. These are just two examples of difficulties that exist with searching using mobile phones and other client devices.

This disclosure describes gesture-based search techniques, which allow a search to be performed in response to a gesture. Generally, a client device receives as input a gesture that defines a region of content or a subject matter of content that is consumed by the client device. For example, the client device may display content on a display to a user. For another example, the client device may play a video or an audio to the user. The client device may subsequently receive a gesture from the user that defines a region of content within the displayed content on the display or a subject matter of content that is consumed by the client device. The gesture may include, but is not limited to, touch input to a touch screen or touch pad of the client device, a body motion detected by an image capture device of the client device, and/or a motion of a cursor controlled by a mouse or other user input device. In some examples, the region of content defined by the gesture may be a region that is substantially bounded by the gesture (e.g., a generally circular gesture) or a region that is touched or overlapped by the search gesture. In other embodiments, the gesture may be interpreted as a general search request and the client device and/or search service may interpret the displayed content and/or context information to develop a search query.

Additionally or alternatively, the gesture may include a motion of the client device itself. The motion of the client device may be detected by, for example, an accelerometer, an attitude sensor, a compass, etc. The motion of the client device may indicate an intent of the user to perform a function related to the content that is consumed by the client device, e.g., causing a search for information of the content that is consumed by the client device.

In some embodiments, the client device may display a representation of the region of content defined by the search gesture on the displayed content, to provide visual feedback to the user of the size and shape of the gesture. The representation of the region of content may comprise, for example, a line enclosing the region of content, a highlighting view of the region of content, and/or a magnifying lens view of the region of content.

In some embodiments, the region of content may include textual information, pictorial information, image information, audio information, and/or video information that is/are defined by the gesture. Additionally, the gesture may define context information that is included in an area surrounding the region of content and/or related to the displayed content. By way of example and not limitation, the context information may include content proximate to the region of content, a paragraph having a portion thereof within the region of content, a sentence having a portion thereof within the region of content, a title of a document having a portion of the document within the region of content, a uniform resource locator where the displayed content is located, an image having a portion thereof within the region of content, a representation of an audio recording having a portion thereof within the region of content, and/or a video having a portion thereof within the region of content. The context information may additionally or alternatively include information related to an application used to display the displayed content, historical actions of the user associated with the application within a same session and/or one or more past sessions, location data of the client device, approved or selected personal information of the device user or owner, and/or metadata associated with the displayed content. In response to completion of the gesture, the client device may formulate a search query based at least in part on the information defined by the gesture (i.e., the region of content or the subject matter of the content), and may cause a search to be performed, for example, based upon the search query.

In some embodiments, one or more subsequent inputs may be detected by the system to reformulate, refine, or otherwise alter the search query. Examples of subsequent inputs that may be used to alter the search include, without limitation, a pinch gesture to resize the region of content defined by a search gesture, a dragging gesture to move a representation of the search gesture to define a different region of content, an additional search gesture, a voice input, eye motion detection, and/or selection of search entities.

The gesture-based search techniques described herein allow a user to perform a search seamlessly from within any application and while performing any task by simply inputting a gesture that defines or identifies the content to search. These gesture-based search techniques allow a user to perform a search without manually inputting a search query by, for example, typing or voice input, thereby improving searching experience of the user. The gesture-based search techniques may be used to search the Internet, local memory of the client device, or any other corpus of data. Thus, the gesture-based search techniques described herein streamline and simplify the process of initiating the search for information, thereby improving a user's productivity. The search results can be presented as an ordered list of results (e.g., titles only, key words in context, excerpts of relevant content, images, audio and/or video clips, or combinations of any of these), and may be displayed within or overlaid on the displayed content as described in more detail below.

Multiple and varied implementations and embodiments are described below. The following section describes an example environment that is suitable for implementing gesture-based search. The following sections describe illustrative aspects of the gesture-based search techniques.

Exemplary Architecture

FIG. 1 is a schematic diagram of an example environment 100 usable to implement gesture-based search. The environment 100 includes a user 102 and a client device 104. The client device 104 may be implemented as any one of a variety of conventional computing devices such as, for example, a desktop computer, a notebook or laptop computer, a netbook, a tablet or slate computer, a surface computing device, an electronic book reader device, a workstation, a mobile device (e.g., Smartphone, personal digital assistant, in-car navigation device, etc.), a game console, a set top box, or a combination thereof.

The client device 104 includes one or more processors 106 coupled to memory 108. The client device 104 may further include one or more communication connections 110 and one or more input/output interfaces 112. The communication connection(s) 110 allow the client device 104 to communicate with other computing devices over wired and/or wireless networks and may include, for example, wide area, local area, and/or personal area network connections. For example, the communication connection(s) 110 may include cellular network connection components, WiFi network connection components, Ethernet network connection components, or the like. Depending on the type of client device, the input/output interfaces 112 may include, for example, a touch screen or other display, a keyboard, a mouse, a touch pad, a roller ball, a scroll wheel, an image capture device, an audio input device, an audio output device, and/or any other input or output devices. The memory 108 is an example of computer-readable media. Computer-readable media includes at least two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media include, but are not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

The memory 108 includes one or more program modules 114 and program data 115. In the illustrated example, the program modules 114 include any number of application(s) 116 that are capable of, among other things, displaying content to a user on a display of the client device 104. By way of example and not limitation, application(s) 116 may include a web browser, an email client, a word processing application, a spreadsheet application, a voice recording application, a calendaring application, a news application, a text messaging client, a media player application, a photo album application, an address book application, a viewfinder application, a social networking application or a game.

In the illustrated example, the program modules 114 further include a gesture detection module 118 to detect gestures input to the client device 104. In particular, the gesture detection module 118 may be configured to detect one or more search gestures. In some examples, a single search gesture may define a scope of the search (e.g., by defining a region of content to be searched) or a subject matter related to content consumed by the client device 104, and causes the search to be performed (e.g., sends a search query to a search engine). For example, the client device 104 may consume content such as playing a video. The user 102 may shake or perform a predefined or user-defined motion, for example, of the client device 104 itself, to perform a search related to the video such as performing a search based on title, actor(s), developer, etc., of the video.

In another embodiment, the search gesture may include a touch input from one or more fingers of the user 102 or a pointing device such as a stylus or digital pen. The gesture detection module 118 may detect the touch input from the user 102 through a touch screen, a touch pad, or another input/output interface 112 of the client device 104.

In another embodiment, the search gesture may include an eye movement of the user 102. The gesture detection module 118 may detect the eye movement through an image capture device of the client device 104.

In yet another embodiment, the search gesture may include a motion of a body or a part of the body of the user 102 such as a finger, a hand, head, and/or an arm. The gesture detection module 118 may detect the body motion through a camera, other image capture device or any motion detection component of the client device 104. For example, the client device may be a gaming device with a camera or other motion detection interface such as an Xbox® gaming console configured with a Kinect™ motion detection system, both available from Microsoft Corporation of Redmond Wash. The client device may receive and interpret images or signals the client device received to determine what motion the user 102 is performing. The motion of the user 102 may trigger the search and/or define a scope of the search. Additionally or alternatively, the scope of the search may be determined with reference to a context in which content is being displayed.

In some embodiments, the search gesture may include a motion of a remote controller (e.g., pointer, joystick, game controller, or the like) controlled by the user 102. The gesture detection module 118 may detect the motion of the remote controller controlled by the user 102 through a detector in proximity to the remote controller, which transmits information of the motion of the remote controller to the gesture detection module 118. In other embodiments, the search gesture may include a motion of a cursor controlled by a mouse, track ball, or other input device coupled to an input/output interface 112 of the client device 104. In that case, the gesture detection module 118 may detect the motion of the cursor controlled by the input device.

Although separate search gestures are described in the foregoing embodiments, a search gesture may include a combination of one or more search gestures as described above.

The system may further include a gesture tracing module 120 which presents for display a line or other representation of the search gesture on the display in response to entry of the search gesture by the user 102. The representation of the search gesture may be displayed in accordance with the motion of the search gesture. The representation provides feedback to the user, indicating the size and shape of the gesture that he/she just entered. The representation may include, but is not limited to, a line enclosing the region of content, a highlighting view of the region of content, and/or a magnifying lens view of the region of content.

As discussed above, the region of content or the subject matter of the content that is defined or identified by the search gesture may include textual information, image information, visual representations of audio information, and/or video information. The client device 104 may further include a content analysis module 122 to analyze the information included in the region of content or the subject matter of the content, and to formulate a search query based at least upon the analysis. In some embodiments, the content analysis module 122 may also analyze context information providing signals as to the context in which the region of content, for example, is presented. By way of example and not limitation, context information may include content proximate to the region of content, a paragraph having a portion thereof within the region of content, a sentence having a portion thereof within the region of content, a title of a document having a portion of the document within the region of content, a uniform resource locator where the displayed content is located, an application identifier of an application used to display the displayed content, metadata associated with the displayed content, and/or a location of the client device on which the content is displayed. The context information may be used by the content analysis module 122 to improve a relevance of search results by formulating a more relevant search query and/or ranking search results in order of relevance, based at least in part on the context information.

In some embodiments, the content analysis module 122 may extract one or more keywords from the information included in the region of content and formulate the one or more keywords into a search query. In one embodiment, the one or more extracted keywords may include text of the region of content defined by the search gesture, tags of images defined by the search gesture. In some examples, the keywords may comprise visual keywords, which may be used to perform a search for images that are visually similar to, or related to, the visual keyword.

Additionally or alternatively, the content analysis module 122 may incorporate context information related to the displayed content, a location of the client device 104 such as GPS data, the application and/or one or more historical actions and/or sessions of the user 102, and formulate the search query based on this additional information. By way of example and not limitation, the content analysis module 122 may determine that based on recent email correspondence, the user 102 is planning a trip, and may infer that the instant search is related to planning the trip. Additionally or alternatively, the content analysis module 122 may determine that based on past email correspondences on a subject/topic and/or with another user, the user 102 is planning a trip with another user, and may infer that the instant search is related to planning the trip. Thereupon, the content analysis module 122 may formulate the search query based upon the region of content and/or context information related to the region of content such as information in the past email correspondences, in view of the determined intent of the user to plan the trip. Thus, in the trip example, the content analysis module 122 may infer that if the region of content includes a location, the user may be planning a trip to that location and may formulate the search query accordingly. Furthermore, the content analysis module 122 may further incorporate other context information such as GPS data of the client device 104, a website from which the content is being served, a calendar entry that the user has open with details about a trip, or the like, to formulate the search query. Referring back to the trip example, even though the gesture does not define content relating to a particular location, the content analysis module 122 may still determine that the search relates to planning a trip based on the fact that the website serving the content is a travel web site, or a title of the article involves travel, for example.

Additionally, the content analysis module 122 may further submit the formulated search query to a given website that provides information of flight or train scheduling service to find out schedule and/or price of the determined trip. The content analysis module 122 may determine the given website by examining bookmarks or history of a web browser or a search application in the client device 104. The user 102 may be given an opportunity to modify the search before and/or after the client device 104 displays the search results of the search query.

The program modules 114 may also include a voice recognition module 128 usable to recognize voice commands and/or inputs, and translate the voice commands and inputs into textual inputs. The client device 104 may then use these textual inputs to formulate or refine a search query. In an event that the client device 104 may be used by more than one user, the voice recognition module 128 may further identify the present user and retrieve historical information (e.g., within a predefined period of time such as within one hour) related to the present user for formulating or refining the search query.

The client device 104 may further include a gesture learning module 130, to allow the user 102 to define one or more gestures. For example, the gesture learning module 130 may allow the user 102 to define custom gestures for panning, searching, copying, pasting, deleting, etc. The gesture learning module 130 may gather information for each of these user-defined gestures, such as curvature, gesture speed, or the like, to differentiate the user-defined gestures from one another.

The client device 104 may further incorporate personal data stored in the client device 104 to formulate or refine a search query. In one embodiment, the program data 115 of the client device 104 may include personal data 124 of the user 102 and other data 126. The personal data 124 may include, but is not limited to, an address book, a contact list, a calendar, call logs, and/or current location data, such as global positioning system (GPS) data that is obtained by a GPS module (not shown) of the client device 104. The personal data 124 may further include social data gathered from social networks, contacts, telephone logs, text message logs, affiliations and memberships of the user 102, and the like. As discussed above, before any personal information is used to formulate a search query, the user may be prompted whether he/she desires to share this information and given the option to always share this information, never share this information, or to be prompted each time before sharing the information. The other data 126 may include documents, files, images, photos, emails, or any other content or data stored on the client device 104. Any or all of the program data 115 may be used in formulating the search query as permitted by the user 102.

Example Use Scenarios

FIGS. 2-11 illustrate various use scenarios possible using gesture-based search. The use scenarios are described with reference to the example environment 100 of FIG. 1 for convenience. However, the use scenarios are not limited to use with the example environment 100 of FIG. 1.

Figure 2:
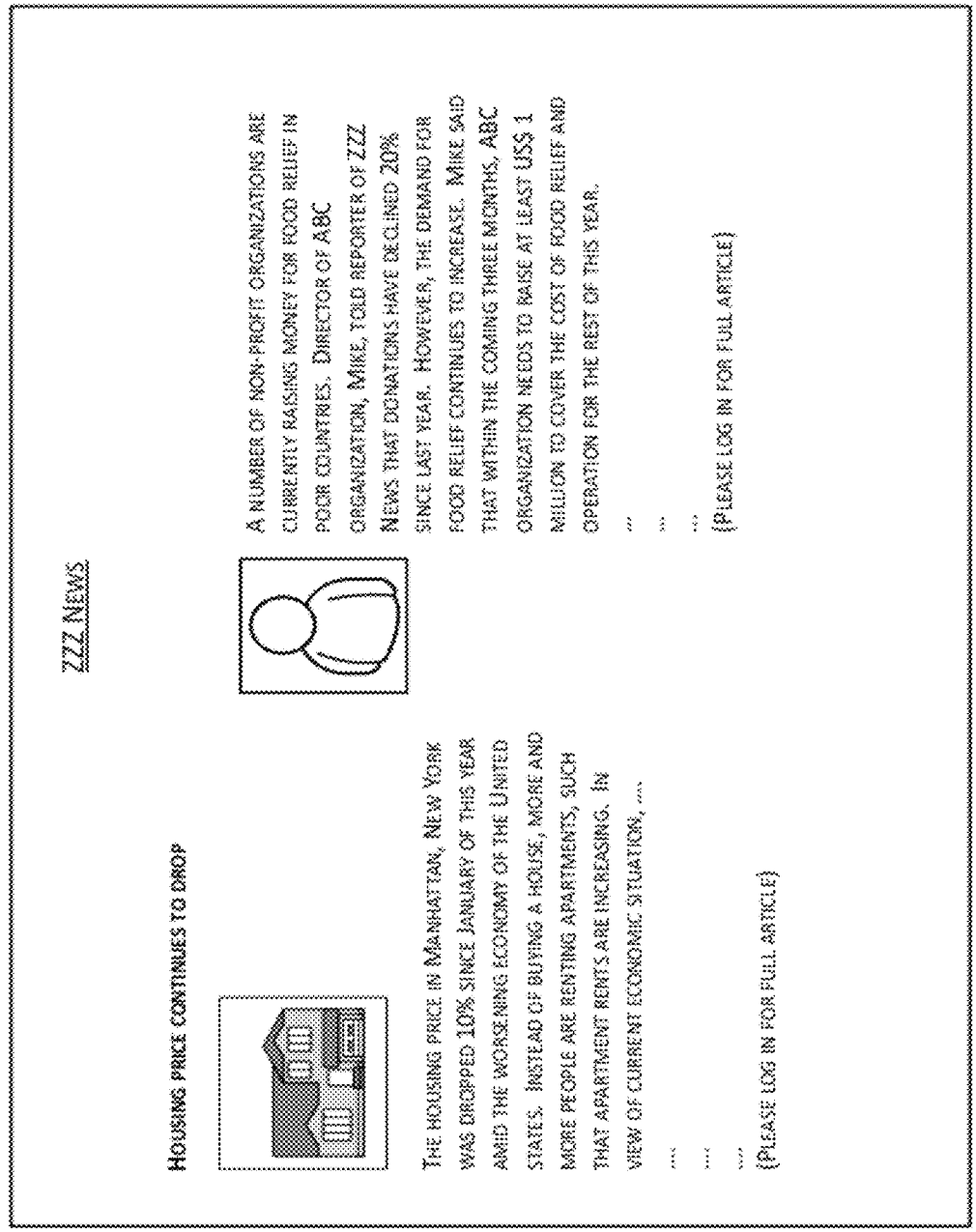
FIG. 2 is a schematic diagram of example content presented on a display of a client device.

FIG. 2 illustrates an example in which the user 102 is using an application running on the client device 104. The client device 104 may present content of the application on a display 200 of the client device 104. The presented content may include text, an image, a representation of audio content and/or video. In some embodiments, the application may include a web-enabled application such as a web browser, an email application, a news application, or the like. For example, the user 102 may read content of a web page presented by a web browser on the display as shown in FIG. 2. In other embodiments, the application may be an application that is not web-enabled. The gesture-based search techniques described herein are applicable to any application that displays or otherwise presents content to a user.

Previously, if the user 102 were interested in learning more about content being displayed, the user would have had to exit or minimize the content they were currently viewing, and open a web browser to perform a search. The gesture-based search techniques described herein allow a user to perform a search from within any application by simply entering a search gesture defining the content they wish to search.

Figure 3:
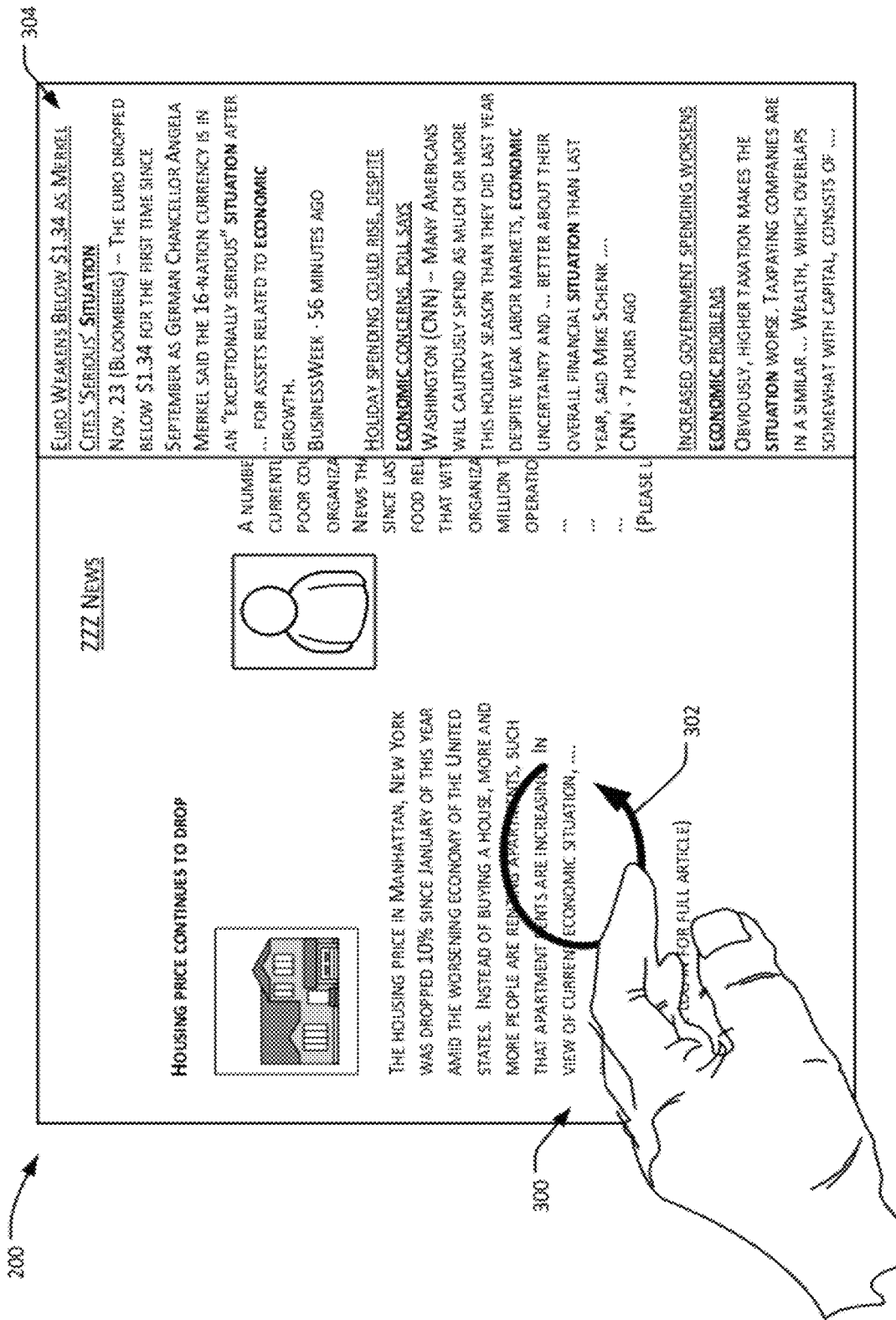
FIG. 3 is a schematic diagram of an example process of performing a gesture-based search, and illustrates an example search gesture defining a subset of the content presented on the display of FIG. 2.

FIG. 3 illustrates an example process of performing a gesture-based search, and illustrates an example search gesture 300 defining a region of the content presented on the display 200. In the illustrated example, the search gesture 300 of the user 102 includes a shape that bounds or substantially bounds a region of content, such as an oval motion or a generally oval motion, a circular motion or a generally circular motion, or a freeform bounded motion.

In the illustrated example, the gesture tracing module 120 renders a line representation 302 of the search gesture on the display in response to entry of the search gesture 300 by the user 102. The representation 302 of the search gesture approximates the motion of the search gesture 300 entered by the user 102 and provides visual feedback to the user of the size and shape of the gesture that he/she just entered. As discussed above, other types of visual representations, such as highlighting and/or a magnifying lens may be used to identify the region of content.

The region of content may define the scope of the search and be used to formulate the search query. A shape substantially bounds a region even though the shape does not form a complete boundary around the region (e.g., there is a gap between starting and ending points of the shape, such that the shape is at least partially unbounded). In one example, a shape will be said to substantially bound a region of a gap in the boundary is less than ⅓ the total length of the gesture. In other embodiments, the search gesture may include a motion of any shape. In the case where the search gesture does not bound or substantially bound a region, the gesture may define the region of content as a region that is touched by, proximate to, or overlapped by the search gesture. These and other example search gestures are described in more detail with reference to FIGS. 12A-12E.

In response to completion of formulating the search query, the client device 104 may automatically submit the search query to a search engine or search service. Additionally or alternatively, the client device 104 may present the search query to the user 102 on the display and ask the user 102 to confirm and/or modify the search query. In other embodiments, the client device 104 may present a plurality of potential search queries to the user 102 and allow the user 102 to select one of the plurality of search queries to use to conduct a search. In some embodiments, the client device 104 may further allow the user 102 to modify the search query or potential search queries presented on the display.

The client device 104 may submit the selected search query or the modified search query to the search engine or the search service.

In one embodiment, the search service may return one or more search results to the client device 104 which may then present the one or more search results to the user 102. Additionally or alternatively, the search engine or the search service may interpret the search query and identify a task the user 102 wants to complete (e.g., make a reservation, get directions, etc.). The search service may further interpret the search query and identify the task the user 102 may want to complete based on context information related to the region of content. For example, the search engine or the search service may identify that the user 102 looking for a location of a restaurant based on identifying the name of the restaurant in the search query and/or identifying the context information including a name of an application, e.g., a calendar application, from which the region of content is obtained. For another example, the client device 104 may receive and/or provide recommendations and/or advertisements based on the identified task of the user 102.

Upon receiving the one or more search results from the search engine, the client device 104 may present the search results 304 on the display 200. In some implementations, the search results may be displayed immediately after the gesture 300 is received. In one embodiment, the client device 104 may overlay the search results 304 on a portion of the displayed content. This allows the user to view the search results without exiting or minimizing an application or task with which the user was previously engaged. By way of example and not limitation, a slide out window including the one or more search results may be overlaid on a portion of the displayed content. In some embodiments, the client device 104 may overlay the search results on a portion of the displayed content that does not include the region of content defined by the search gesture 300. In one embodiment, the search results 304 presented to the user 102 may be a simplified version of the search results received from the search engine. For example, the search results 304 may include only a title, or a title and a limited number of characters.

Upon viewing the search results 304, the user 102 may desire to broaden, narrow, refine, refocus, or otherwise alter a scope of the search. For example, a user may determine that the original search gesture 300 did not encompass some of the content for which the user desired to search. In that case, the user may desire to broaden the search to include additional content. In another example, the user may desire to move the representation 302 defined by the gesture to include a word that is just outside the representation 302 but that the user intended to be included in the representation 302, or to exclude a word that is within the representation 302.

Figure 4:
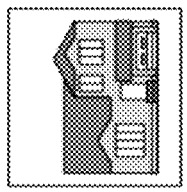
FIG. 4 is a schematic diagram of an example process of resizing the representation of the search gesture of FIG. 3.

FIG. 4 illustrates an example technique for altering a scope of a search by resizing the representation 302 defined by the search gesture to include a different region of content to refine the search, thereby broadening or narrowing a scope of the search. In the illustrated example, the user 102 resizes the representation 302 by a resizing gesture 400. Different resizing gestures may be used to broaden or narrow a scope of the search. For example, in the illustrated embodiment, a reverse pinch gesture (shown by the opposing arrows in FIG. 4) is used to broaden a scope of the search. In another example, a pinch gesture may be used to narrow a scope of a search. The resizing gesture 400 is detected by the gesture detection module 118, which instructs the gesture tracing module 120 to render a resized gesture representation 402. In response to the resizing gesture, the content analysis module 122 of the client device 104 may instantly or continuously (i.e., during the resizing gesture 400) update the search query, submit the updated search query to the search engine and present new search results received from the search engine based on the updated query. In another embodiment, the client device 104 may update the search query, submit the updated search query and receive new search results from the search engine in response to a completion of the resizing gesture 400.

Figure 5:
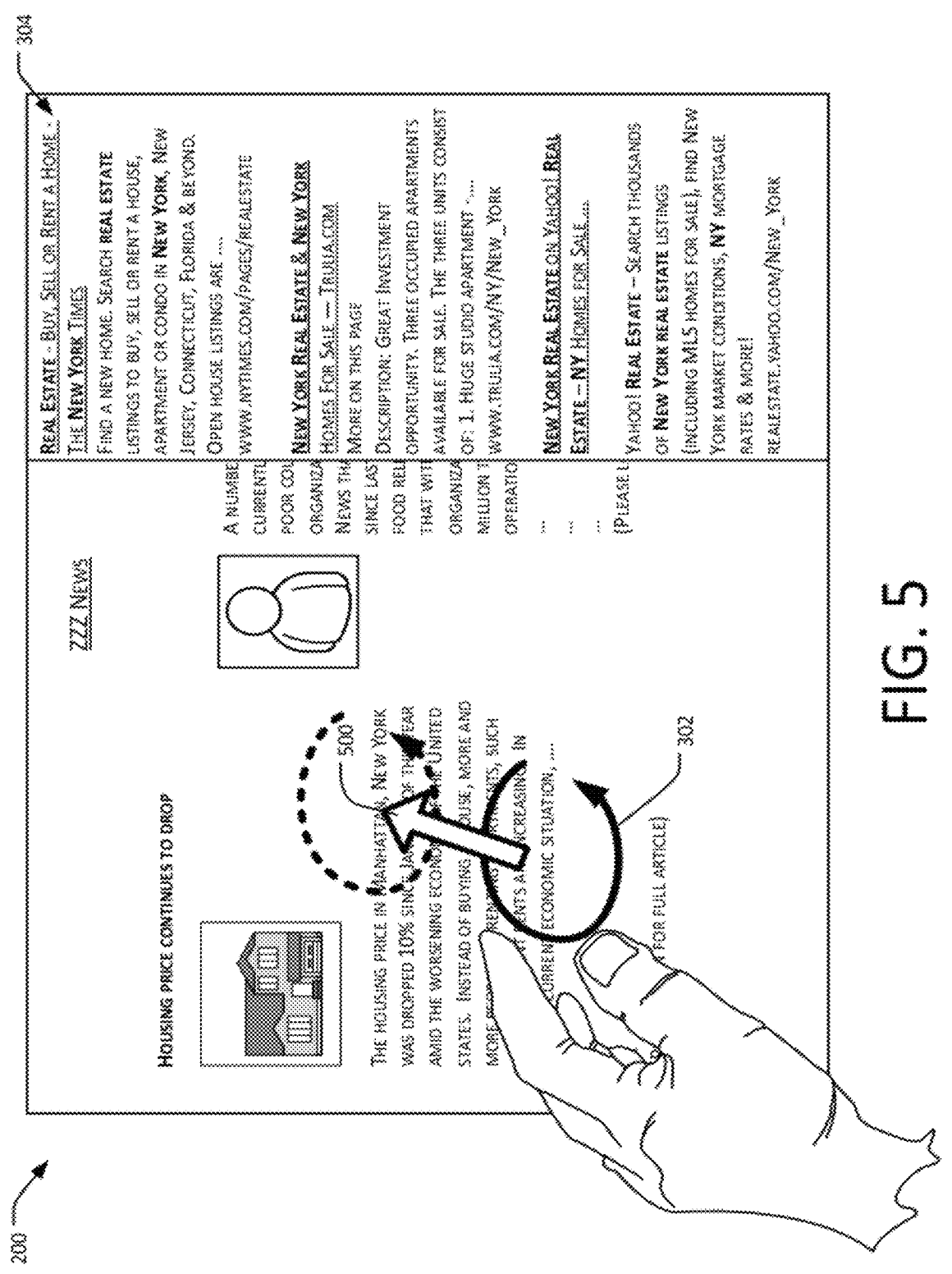

FIG. 5 illustrates another example technique of altering a scope of a search, in which the user 102 may alter a scope of the search by relocating the representation 302 defined by the search gesture to a new position on the displayed content. Specifically, the user 102 may input a relocation gesture 500 to relocate the representation 302 to a new location (shown in broken lines). Similar to the resizing example above, the content analysis module 122 of the client device 104 may continuously or instantly update the search query as the user 102 relocates the representation 302, or may wait until completion of the relocation gesture 500 to update the search query. Alternatively, the scope of the search may be altered by simply redrawing the representation 302 in a new location specified by a new gesture.

Figure 6:
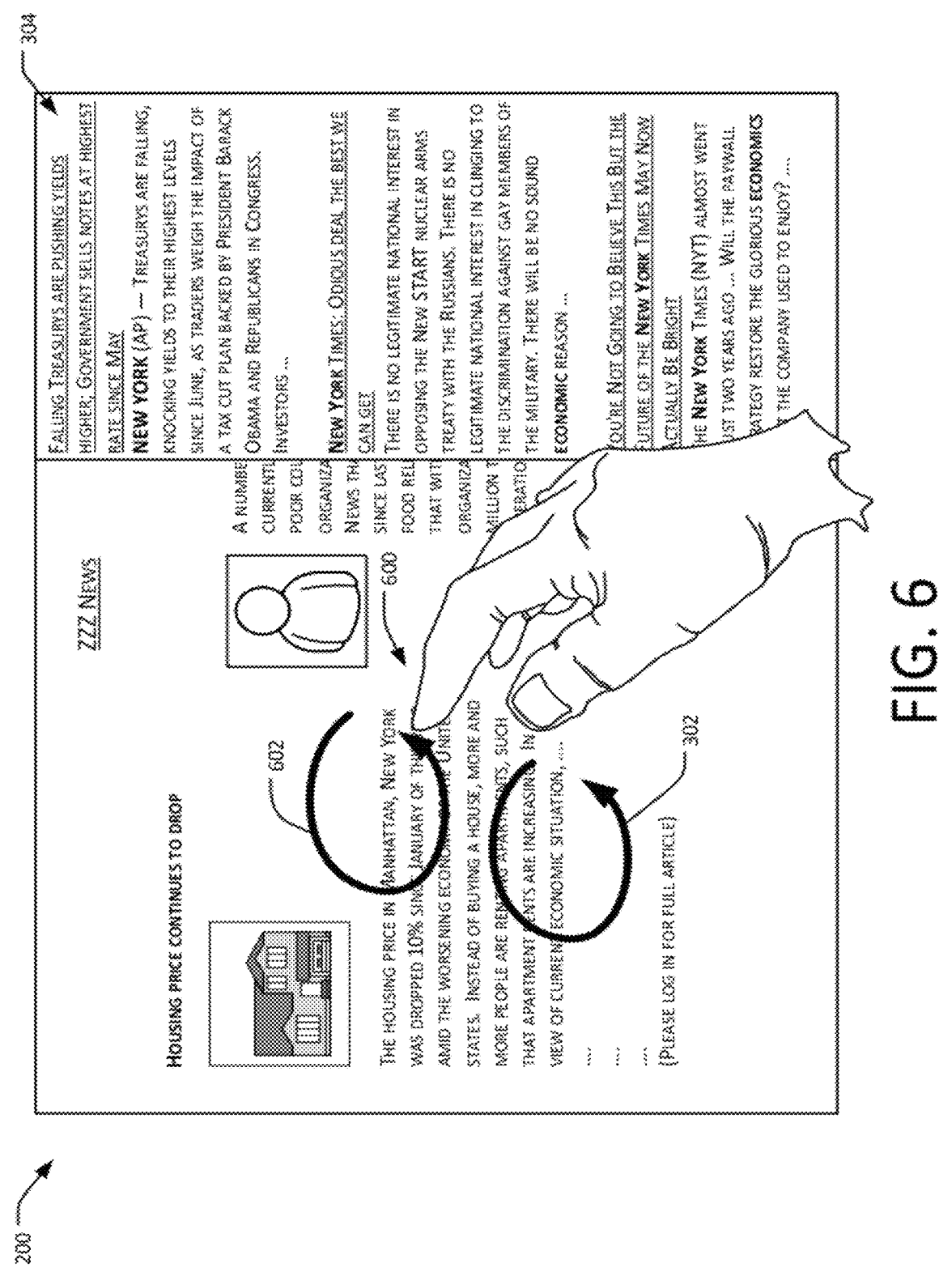

FIG. 6 illustrates another example technique of altering a scope of a search, in which the client device 104 alters the search query in response to detecting one or more new search gestures in addition to the original search gesture. Specifically, in FIG. 6, the user 102 performs a second search gesture 600, which defines a second region of content. The gesture detection module 118 detects the second gesture 600, and instructs the gesture tracing module 120 to output for display a second representation 602 of the second region of content. The client device 104 may then reformulate the search query based at least upon both the first region of content and the second region of content. In some embodiments, information included in the first region of content and information included in the second region of content may be given the same weight or different weights in formulating a new search query. In other embodiments, the client device 104 may use the information included in the second region of content to refine the search by searching a subset of results from within the original search results.

Figure 7:
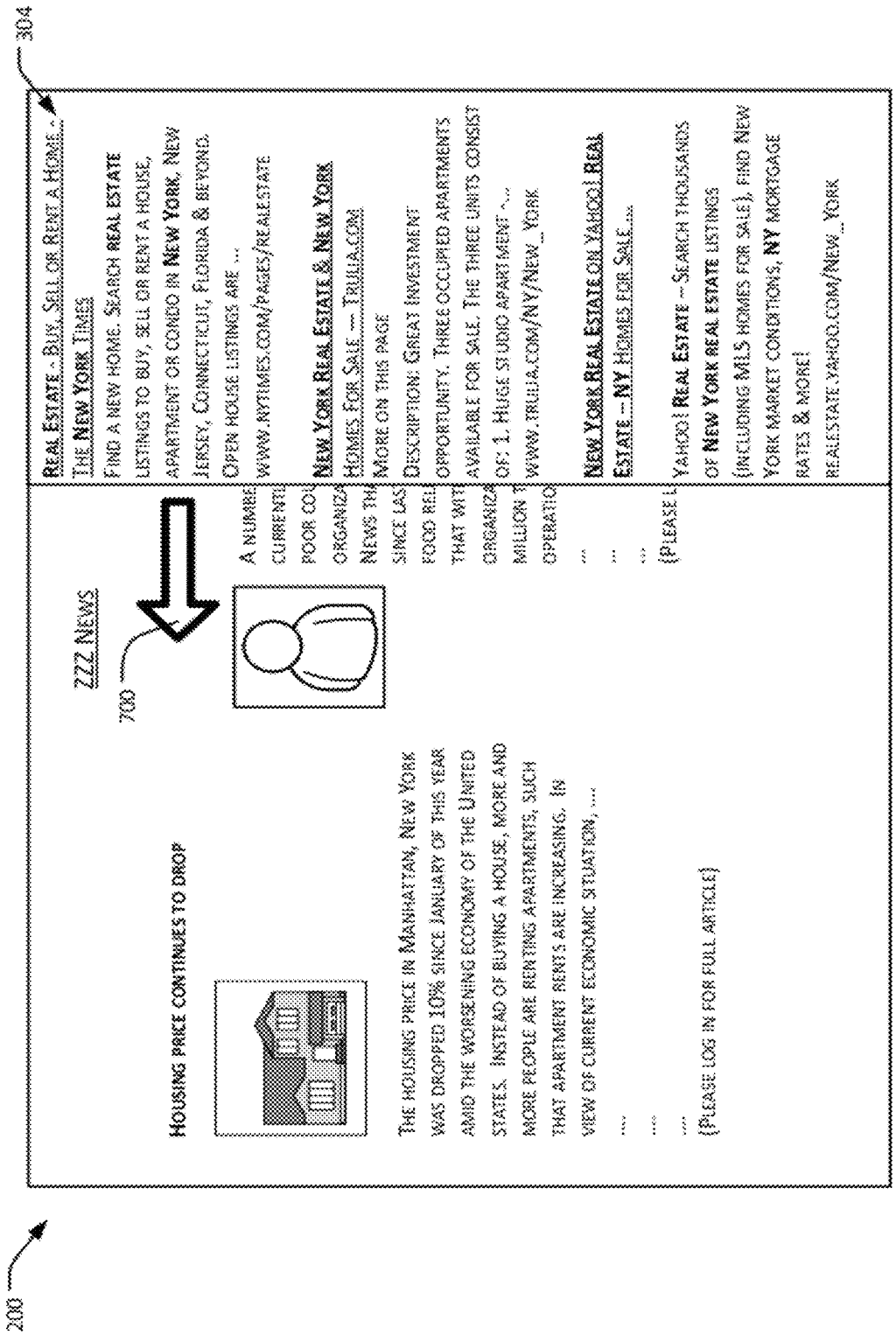
FIG. 7 is a schematic diagram of an example process of expanding a results window.

FIG. 7 illustrates an example of expanding the search results 304 of FIG. 3. As noted above, the search results 304 comprise a simplified or limited version of the search results retrieved from the search engine. To expand the search results and view the full search results, the user 102 may perform an expansion gesture 700 (illustrated as a leftward swipe in FIG. 7) to cause the search results 304, and/or the pane in which they are presented, to be expanded. In the example, of FIG. 7, the user 102 may expand the search results to cover the entire displayed content or the entire display. In the illustrated example, the expansion gesture 700 simulates dragging an edge of the window including the one or more search results 304 towards the rest of the displayed content that is not overlaid by the window.

Figure 8:
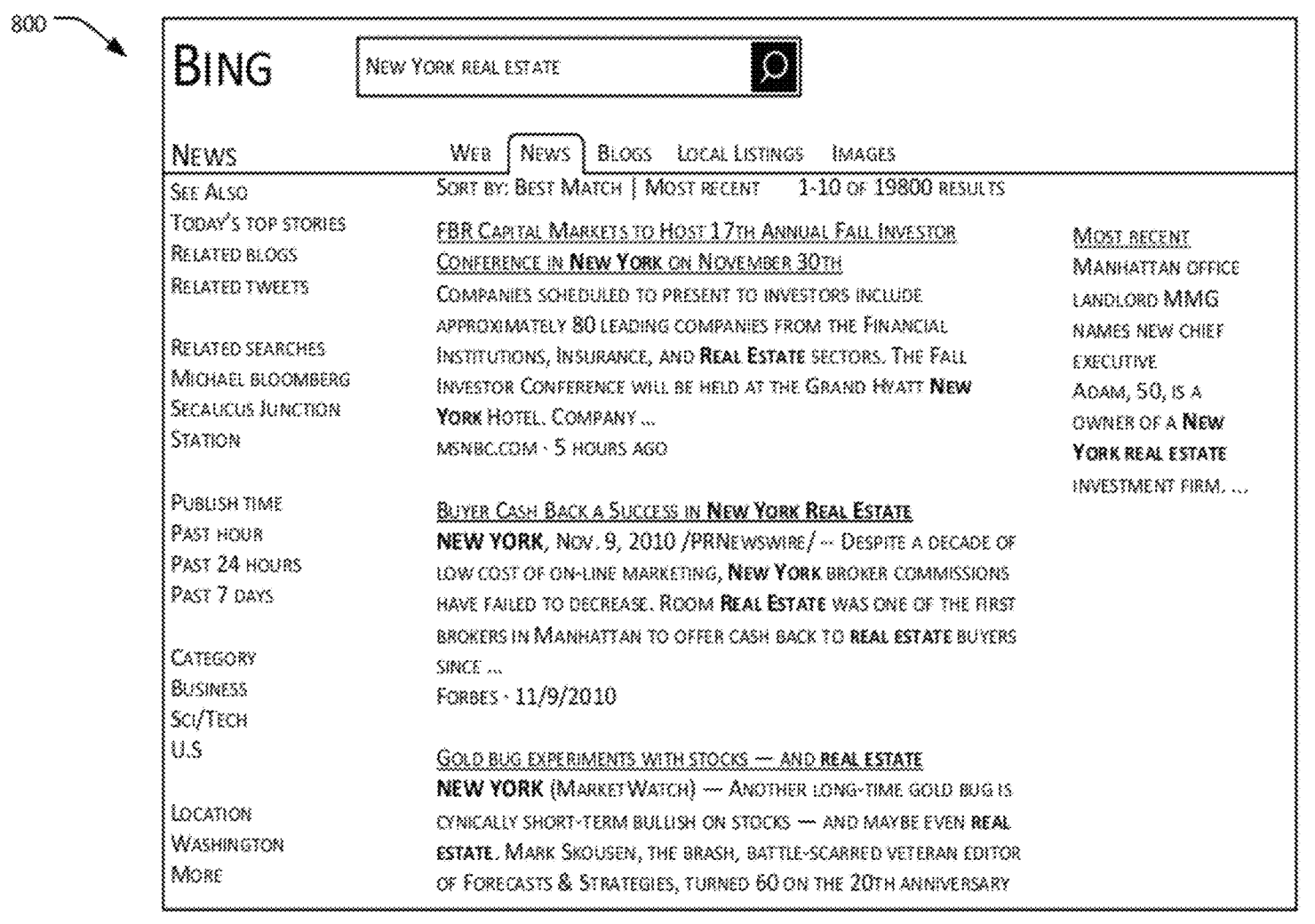

FIG. 8 shows an example of the result of expanding the window including the one or more search results caused by the expansion gesture 700. As shown in FIG. 8, expanded search results 800 is displayed in a full window or full screen mode. In some embodiments, the user 102 may be able to resize the window by performing a resizing gesture (e.g., pinch or reverse pinch) to change a size of the expanded search results 800 window. Additionally or alternatively, the user 102 may move or pan the window to a new position on the display by performing a panning gesture to pan the window to the new position.

Figure 9:
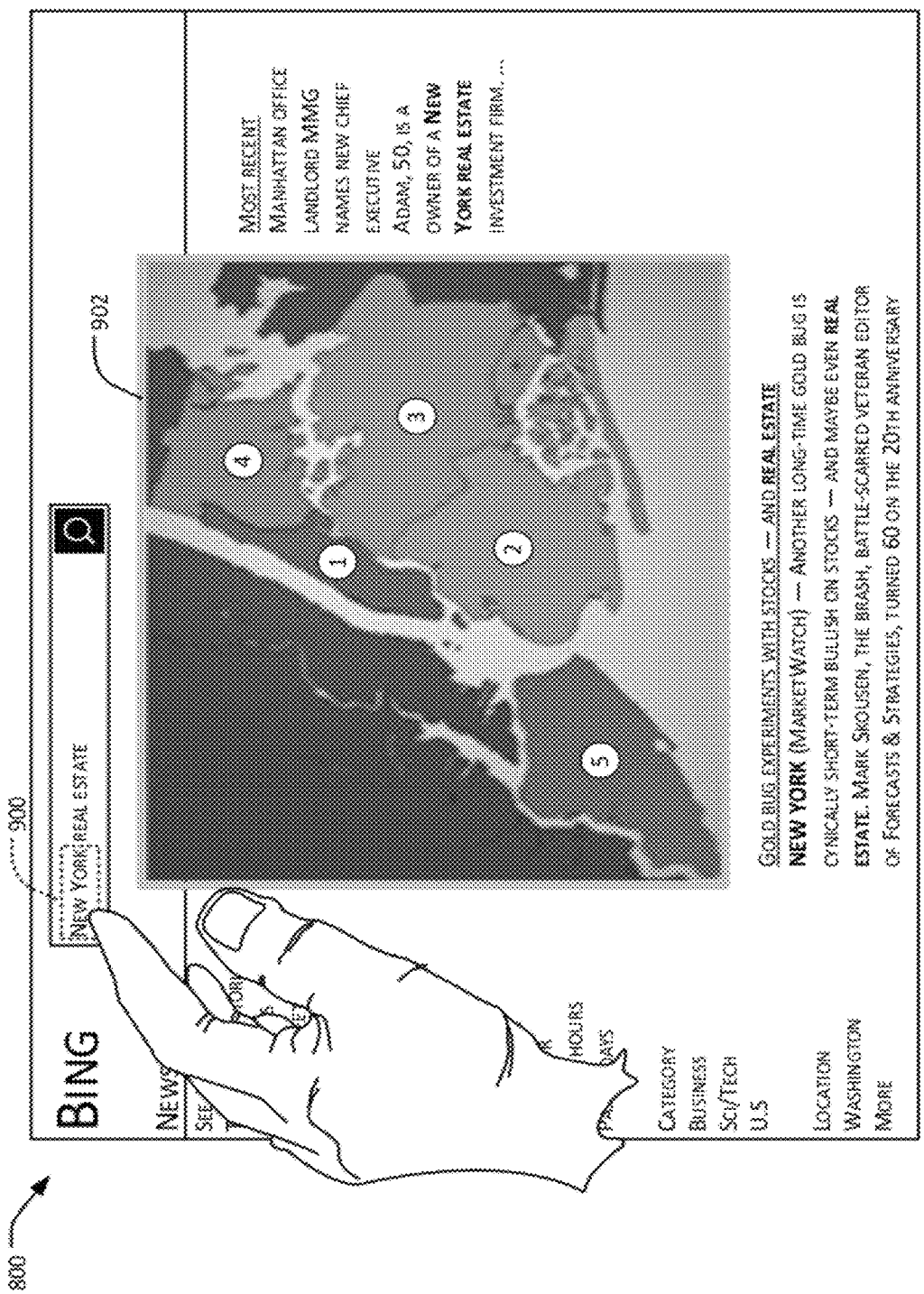
FIG. 9 is a schematic diagram of an example process of refining the search results of FIG. 3 by selection of search entities.

FIG. 9 shows an example of altering the search results 800 by selection of one or more search entities 900. The search query formulated by the client device 104 and/or the one or more search results 304 or 800 presented to the user 102 may include one or more search entities 900. Search entities are predetermined keywords that are representative of the search results. In the example of FIG. 9, the user 102 selects one of the search entities 900 in order to refocus the search results 800. In response thereto, the client device 104 may refine the search query in view of the selected search entity 900 by, for example, weighting the selected search entity more heavily or by searching within the search results 800 for results relevant to the selected search entity.

In some instances, the search query formulated by the client device 104 or the search results 304 or 800 presented to the user 102 may include a name of an entity. The entity may include, but is not limited to, a geographical location, a building, an organization, a retail store, a restaurant, etc. In one embodiment, the user 102 may click on the name of the entity or perform a search gesture around the name of the entity to select the name of the entity. In response to selecting the name of the entity by the user 102, the client device 104 may perform a new search using the name of the entity. In some instances, when the selected search entity is the name of an entity, the new search may include a map search and present a map including a location of the entity. In the illustrated example, the user 102 selected the "New York" search entity 900, and in response, the client device 104 presented a map 902 of New York in a new search page or overlaid on a portion of the original search results 800.

Additionally, the map may include one or more search labels such as those labels in the map (numbered 1-5 in FIG. 9). The search labels may themselves correspond to other search results. The user 102 may select the search labels to view the respective search results, or to initiate a refined search against a part of the map including the selected search label. In return, the client device 104 may present an enlarged selected part of the map and/or one or more search results related to the selected part of the map.

Additionally or alternatively, when the user has granted permission, the client device 104 may further incorporate in the current location of the client device 104 or other personal data 124 to formulate or refine the map search. By way of example and not limitation, the user 102 may click on the term "New York" in the search box as shown in FIG. 9. In response, the client device 104 may perform a map search based upon the term "New York" and the personal data such as an address book of the user 102 stored in the client device 104. For example, the client device 104 may search the address book and find one or more addresses that are within New York or close to New York. In addition to presenting the map including New York as described above, the client device 104 may further present one or more address labels indicating the one or more addresses on the map. The one or more address labels may include names of entities that are stored with the one or more addresses in the address book. However, as noted above, the user 102 may be given an opportunity to opt out of sharing such information as personally identifiable information.

Figure 10:
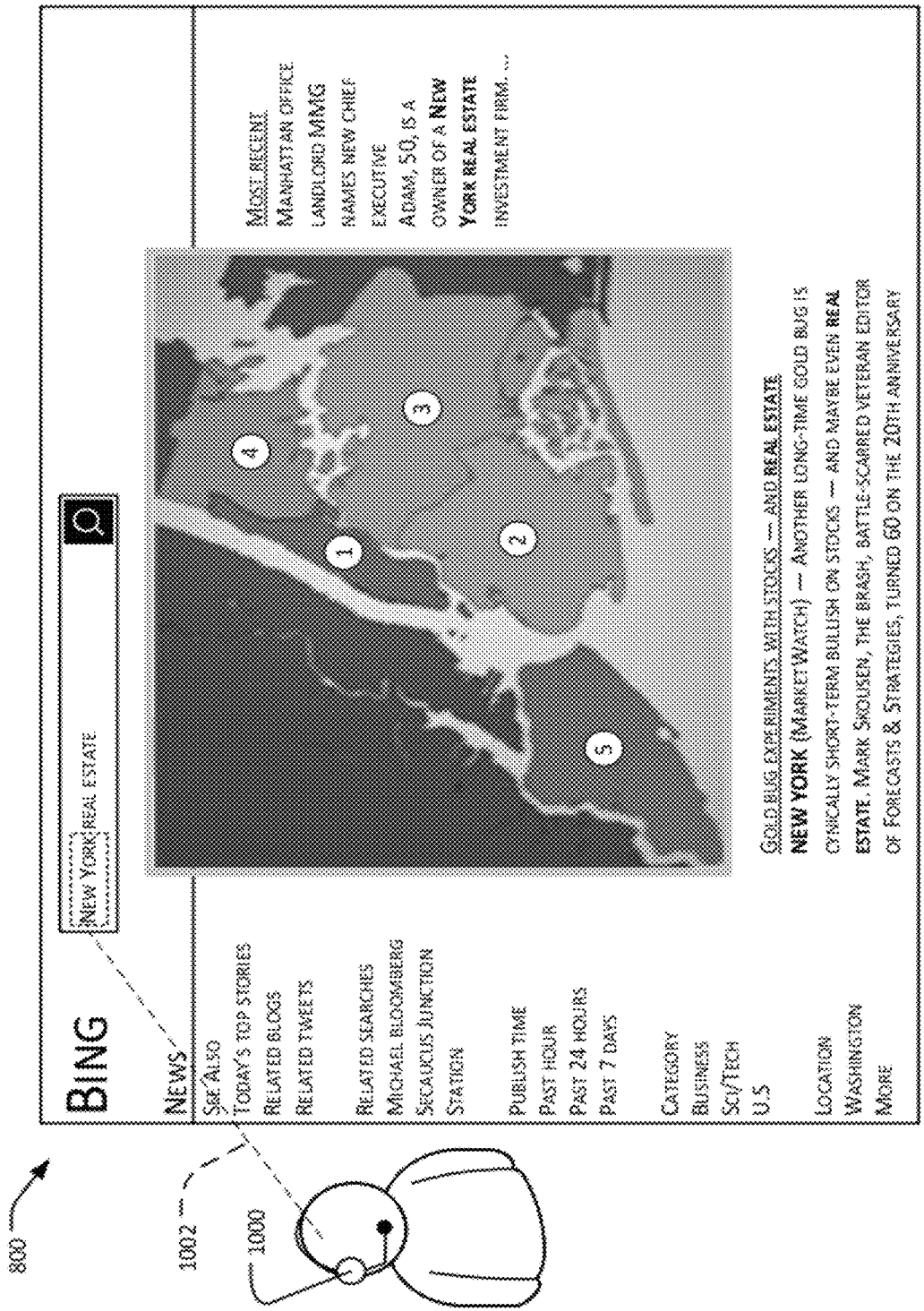
FIG. 10 is a schematic diagram of an example process of refining the search results of FIG. 3 by voice recognition and/or eye motion.

FIG. 10 illustrates another example, in which the search results 800 may be modified by voice input and/or eye tracking data. For example, rather than selecting a search entity by touching the entity on the screen as in FIG. 9, the user may refine the search results 800 by speaking a command or input which is received by an audio input 1000 of the client device 104. The voice recognition module 128 may then translate the voice command and/or input into textual input to refine the search query. For instance, in the illustrated example, the user may speak the command "Search For" and the input "New York" in order to refine the search query to include or emphasize the term New York. In another example, the user 102 may refine the search query by directing their gaze 1002 at a term of interest (the search entity New York in FIG. 10). The user's gaze may be detected by an image capture device, such as a front facing camera of the client device 104. The user's gaze may then be used to generate eye tracking data to determine a word or words at which the user is looking. This eye tracking data can additionally or alternatively be used to refine the search results.

Figure 11:
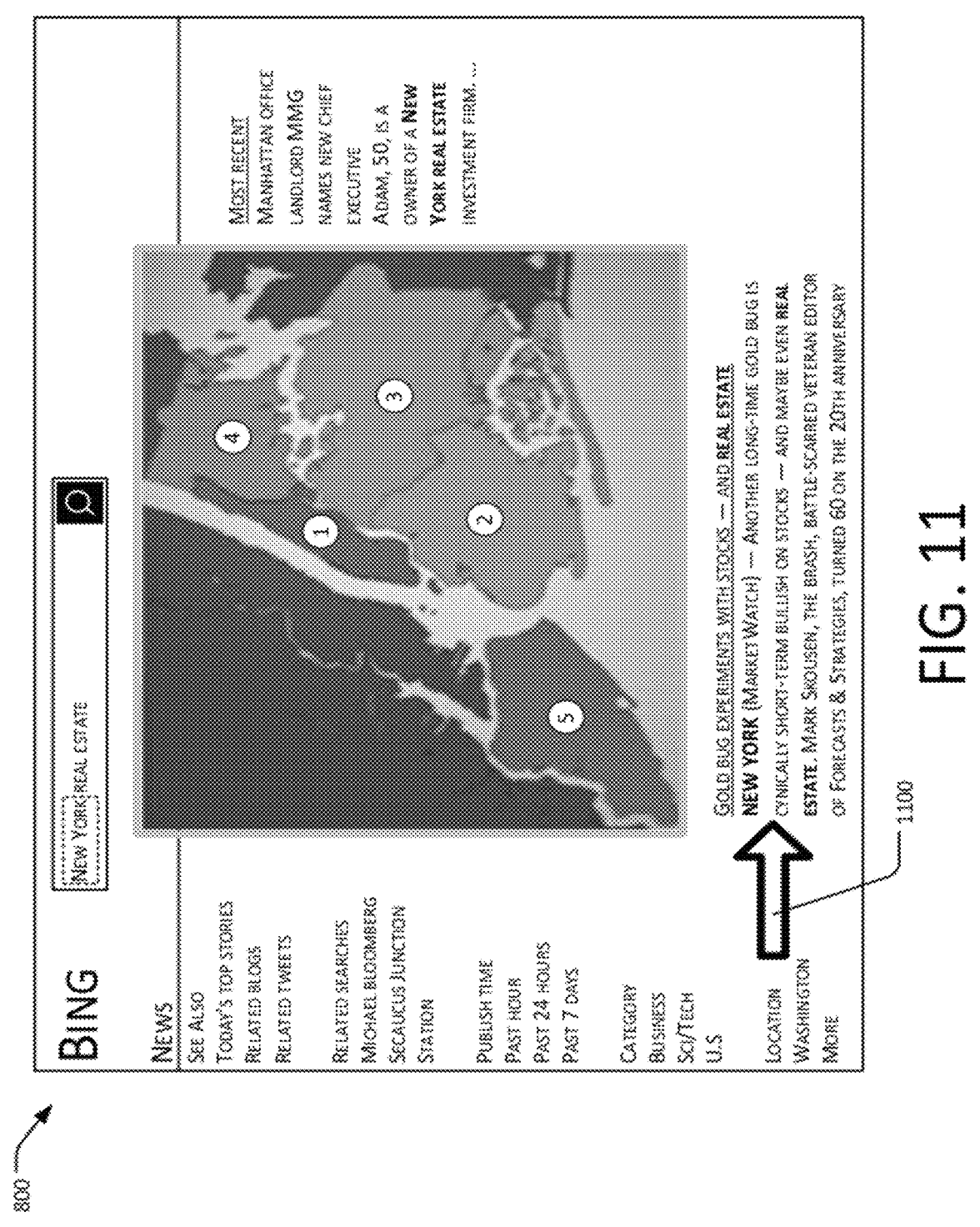

FIG. 11 shows an example technique for collapsing the search results 800. After reading the search results 800 in the expanded results window, the user 102 may hide the results window by a hide gesture 1100. For example, the user 102 may hide the results window by moving or panning the results window towards its original position. The hide gesture 1100 in FIG. 11 is suggestive of sliding the search results closed.

In another embodiment, the user 102 may collapse the results window to a window of a reduced size by a collapse gesture (not shown). By way of example and not limitation, the user 102 may move or pan the results window such that part of the results window still appears in the display and part of the results window is out of the display. In one example, the collapse gesture may be the same as the hide gesture 1100, but at a slower speed and/or of a shorter distance. In response to the collapse gesture, the client device 104 may adjust the results window to display simplified or limited search results such as those shown in FIG. 3. In some embodiments, the user 102 may be able to continuously adjust the width of the search results window to any size, from full screen as shown at 800 in FIG. 8, to the simplified results shown at 304 in FIG. 3, or even smaller.

Gesture Determination

Numerous different techniques may be used to distinguish search gestures (which are configured to trigger a gesture-based search) from other gestures (e.g., gestures to pan or zoom, for example).

In one embodiment, the client device 104 may include a physical search button or a virtual search button or icon displayed on the display. The user 102 may press or press and hold the search button to notify the client device 104 that a search gesture is following. In an event that a virtual search button or icon is used, the client device 104 may present this virtual search button or icon when at least a subset of content displayed on the display is searchable or is allowed to be used as a portion of a search query for performing a search. By way of example and not limitation, when the user is using a word processing application in the client device 104, content presented in the word processing application may be searchable and used for a textual search. The client device 104 may then present a virtual search button or icon overlaid on the application to allow the user 102 to initiate a search gesture. Additionally or alternatively, the client device 104 may receive a voice command or input from the user 102 to begin a search gesture.

In some embodiments, the client device 104 may allow the user 102 to use two or more fingers cooperatively to indicate a search gesture defining a region of content. By way of example and not limitation, the user 102 may press and hold an area or a spot on the display with a finger, and use another finger to draw a gesture to define a region of content on the display. In one embodiment, the user 102 may press and hold any area or spot on the display to initiate the search gesture. In another embodiment, the user 102 may press and hold a designated area or spot on the display such as one of bottom corners of the display to indicate an initiation of a search gesture. In each of these examples, the first touch constitutes a command indicating that a search gesture is imminent, and the second touch includes the gesture that defines the scope of the search and initiates the search.

In other embodiments, the user 102 may press and/or hold an area or a spot on the display for a predetermined period of time such as 1 second to indicate an initiation of a search gesture for defining a region of content, followed by a gesture defining the scope of the search. In this example, the press and/or hold and the gesture defining the scope of the search are performed as one continuous motion.

In some embodiments, in response to receiving an indication of pressing and/or holding an area or a spot on the display by the user 102, the client device 104 may present an icon, an indication or the like to indicate to the user 102 which mode (panning, searching, copying, etc) the client device 104 is entering. For example, the user 102 may press and/or hold an area or a spot on the display with a finger. In response thereto, the client device 104 may present, for example, a panning icon (e.g., under the pressing finger) indicating that the client device 104 is ready for receiving a panning gesture from the user 102. If the user 102 continues to press and/or hold the area or the spot for a first predetermined period of time, the client device 104 may change the panning icon to a search icon indicating that the client device 104 is ready for receiving a search gesture from the user 102. Upon presentation of the search icon by the client device 104, the user 102 may start to perform a gesture to define a region of content on the display. In one embodiment, the search icon or the panning icon may have a size proportional to an area under the pressure from the finger. Additionally or alternatively, the search icon or panning icon may be positioned proximate to directly under the pressing finger (e.g., slightly offset from the user's finger) such that the icon is not obstructed by the user's finger.

In still other embodiments, the client device 104, may be able to discriminate between various gestures on the fly in substantially real time, to determine whether for any given gesture the user 102 intends to enter a search gesture or a swipe gesture to pan or scroll content on the screen. For example, the client device 104 may discriminate between types of gestures based on, for example, the curvature of the gesture, the speed at which the gesture is being entered, and/or context information (e.g., whether the client device is moving, at what speed, at what acceleration, etc.). In this manner, the client device 104 may be configured to determine search gestures without any special command to indicate that a search gesture is forthcoming. The gesture learning module 130 of the client device 104 may be configured to enhance this gesture determination by learning from the user's past interactions with the client device 104, to infer the user's intent from any given gesture.

In some embodiments, the client device 104 may be configured to allow the user 102 to define one or more user-defined gestures in addition to or alternative of pre-defined gestures in the client device 104. In that case, the gesture learning module 130 may provide a session for the user 102 to define user-defined gestures for panning, searching, copying, pasting, deleting, etc. By way of example and not limitation, the user 102 may define semantics and ways to determine a region of content. For example, the user 102 may define a search gesture in form of a check mark as: <gesture name="check" action="search" roc="outerbox"/>. Additionally or alternatively, the gesture learning module 130 may gather information for each of these user-defined gestures such as moving speed to differentiate between the user-defined gestures from one another. The definitions of these user-defined gestures and/or predefined gestures may be stored in a repository such as in the other data 126.

FIGS. 12A-12E illustrate additional example search gestures that may be used to define a search query and initiate a search, in addition to or instead of the generally circular or oval gestures described with reference to FIG. 3 above.

Figures 12A, 12B, 12C, 12D, 12E:
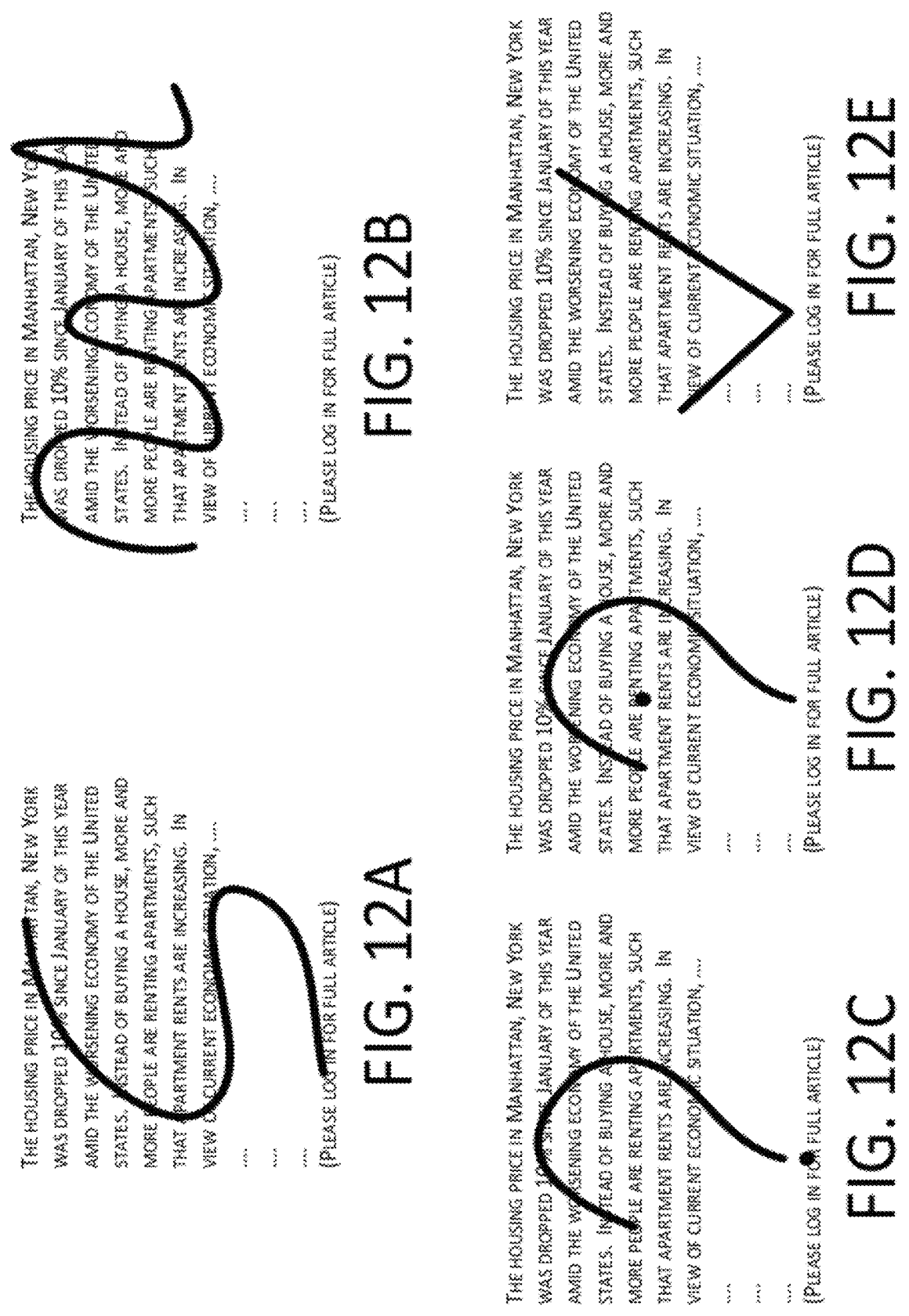

FIG. 12A illustrates an example generally S-shaped gesture which defines a region of content by touching or overlapping the region of content. FIG. 12B illustrates an example squiggle gesture that also defines a region of content by touching or overlapping the region of content. FIG. 12C illustrates an example question mark-like search gesture. The question mark-like gesture of FIG. 12C may define a region of content by touching or overlapping the content or by substantially bounding the content. Furthermore, the user may place a dot at the end of the gesture in order to indicate that certain content should be accorded a higher weight when the content analysis module 122 of the client device 104 formulates a search query for a search. Alternatively, the location of the dot could be used to designate a source to be searched (e.g., the Internet, local memory, a particular folder or file, etc.). FIG. 12D is a variation on the question mark-like gesture, in which the user has placed the dot on the term "renting," indicating that the search query should weight that term more heavily. FIG. 12E illustrates an example checkmark gesture that also defines a region of content by touching or overlapping the region of content.

Alternative Embodiments

Although the foregoing embodiments describe that the client device 104 performs an Internet search in response to receiving a search gesture defining a region of content, the present disclosure is not limited to searches of the Internet.

In one embodiment, the client device 104 may additionally or alternatively perform a local search in response to receiving a search gesture that defines a region of content or otherwise identifies subject matter forming at least a partial basis for the search. In some embodiments, the local search may include a search within the application having the region of content. In other embodiments, the local search may include a search within local memory 114 of the entire client device 104 or a designated memory or folder of the client device 104. For example, the user 102 may be reading an email using an email application. The user 102 may want to search certain information included in the email. The user 102 may then perform a search gesture to define a region of content including or substantially including the desired information to be searched in the email as described above. The client device 104 may then perform a search within the email application, e.g., all email folders, based at least upon the region of content. The client device 104 may present one or more search results in a window overlaid on the email application.

In another embodiment, the client device 104 may perform an image search based on a search gesture of the user 102. For example, the user 102 may note an image in an image processing application or a web page and want to perform a search related to the image. The user 102 may perform a search gesture as described in the foregoing embodiments to define a region of content or otherwise identify subject matter that includes all or part of the image.

In one embodiment, in response to completion of the search gesture, the client device 104 may formulate a search query using the image and perform an image search for the user 102. Upon receiving one or more search results, the client device 104 may present the one or more search results to the user 102 who may further refine the search by performing a new search gesture on the one or more search results.

In other embodiments, the client device 104 may further include an image recognition module (not shown) which may identify one or more objects in the part of the image that is defined by the region of content or is part of the identified subject matter (e.g., a face, a landmark, a product, etc.). The client device 104 may then formulate a search query using the identified one or more objects and perform an image search for the user 102. Additionally, the client device 104 may present the search query to the user 102 prior to performing the image search. The client device 104 may allow the user 102 to confirm or modify the search query, and submit the confirmed or modified search query to complete an image search.

In some embodiments, the client device 104 may include an image extraction module (not shown) which may extract the part of the image that is defined by the search gesture from the image and submit the extracted part of the image to a search service for an image search.

In still other embodiments, the client device 104 may indicate to a search service to focus or limit an image search on the part of the image that is defined by the search gesture. The client device 104 may provide this indication by adding an indicator on the image. For example, the client device may attach a representation of the search gesture such as a line representing the search gesture to the image, and submit the image with the attached representation of the search gesture to the search service for the image search. The user 102 may further interactively alter a scope of the image search through a relocation gesture, a resizing gesture or an additional search gesture as indicated in the foregoing description.

Exemplary Methods

Exemplary methods for performing a gesture-based search are described with reference to FIG. 13 and FIG. 14. These exemplary methods can be described in the general context of computer executable instructions. Generally, computer executable instructions can include routines, programs, objects, components, data structures, procedures, modules, functions, and the like that perform particular functions or implement particular abstract data types. The methods can also be practiced in a distributed computing environment where functions are performed by remote processing devices that are linked through a communication network or a communication cloud. In a distributed computing environment, computer executable instructions may be located both in local and remote computer storage media, including memory storage devices.

The exemplary methods are illustrated as a collection of blocks in a logical flow graph representing a sequence of operations that can be implemented in hardware, software, firmware, or a combination thereof. The order in which the methods are described is not intended to be construed as a limitation, and any number of the described method blocks can be combined in any order to implement the methods, or alternate methods. Additionally, individual operations may be omitted from the methods without departing from the spirit and scope of the subject matter described herein. In the context of software, the blocks represent computer instructions that, when executed by one or more processors, perform the recited operations.

Figure 13:
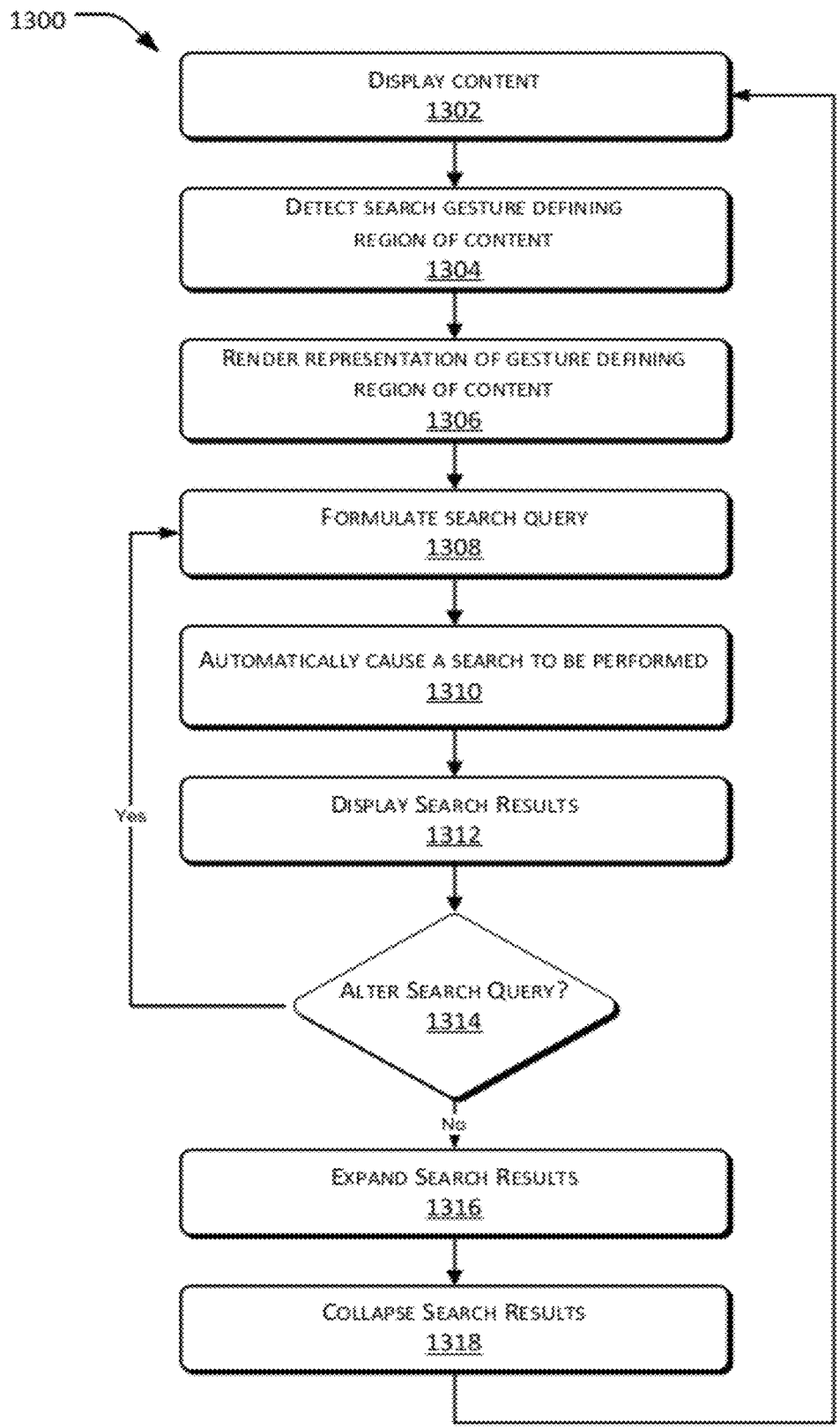
FIG. 13 illustrates a first example method of performing a search based on a search gesture.

FIG. 13 illustrates a first exemplary method 1300 of performing a search based upon a gesture. The method 1300 is described in the context of the example client device 104 for ease of illustration, but is not limited to being performed using such a client device.

At block 1302, content is displayed on a display, such as display 200 of the client device 104. The content may include text, an image, a picture, a visual representation of audio content, and/or video. The content may be displayed within an application, such as a web browser.

At block 1304, a search gesture defining a region of content is detected. The search gesture may include a touch input on a touch screen or touch pad, a body motion detected by an image capture device, and/or a motion of a cursor controlled by a user input device. The region of content defined by the search gesture may include a region that is bounded or substantially bounded by the search gesture, a region that is touched by, proximate to, or overlapped by the search gesture. In one example, the search gesture may include a substantially circular motion that bounds or substantially bounds the region of content.

In response to detecting the search gesture, at 1306, a representation of the region of content defined by the search gesture may be displayed on the displayed content. The representation of the region of content may include a line enclosing the region of content, a highlighting view of the region of content, and/or a magnifying lens view of the region of content.

At block 1308, a search query may be formulated based upon the region of content defined by the search gesture. The search query may be based on the content within the region and, possibly, context information, which is relevant to a search. The context information may include content proximate to the region of content, a paragraph having a portion thereof within the region of content, a sentence having a portion thereof within the region of content, a title of a document having a portion of the document within the region of content, a uniform resource locator where the displayed content is located, an application identifier of an application used to display the displayed content, metadata associated with the displayed content, and/or a geographic location of the client device performing the search.

At block 1310, a search using the search query may be automatically caused to be performed in response to completion of the search gesture. The search query may be sent to a remote search engine, which is separate the client device 104 of the user. Additionally or alternatively, the search may be performed locally in the client device 104. At block 1312, search results are displayed on the display of the client device 104.

At block 1314, the client device determines if the search query should be altered based on, for example, a resizing gesture such as that shown in FIG. 4, a relocation gesture such as that shown in FIG. 5, a subsequent gesture such as that shown in FIG. 6, selection of a search entity as shown in FIG. 9, voice input and/or eye tracking data such as that shown in FIG. 10, or any other inputs indicating that the search query should be altered. If the search query is to be altered, the method 1300 returns to block 1308 to reformulate the search query in accordance with the alteration.

If the search query is not to be altered, the method 1300 continues to block 1316, at which the client device 104 receives an expansion gesture, such as that shown in FIG. 7, and displays expanded search results. At block 1318, the client device receives a hide or collapse gesture, such as that shown in FIG. 11, and hides or collapses the search results, which effectively returns the method 1300 to block 1302 to again display the original content of the application. Thus, the user is able to search content from within an application, without interrupting the user's workflow.

Figure 14:
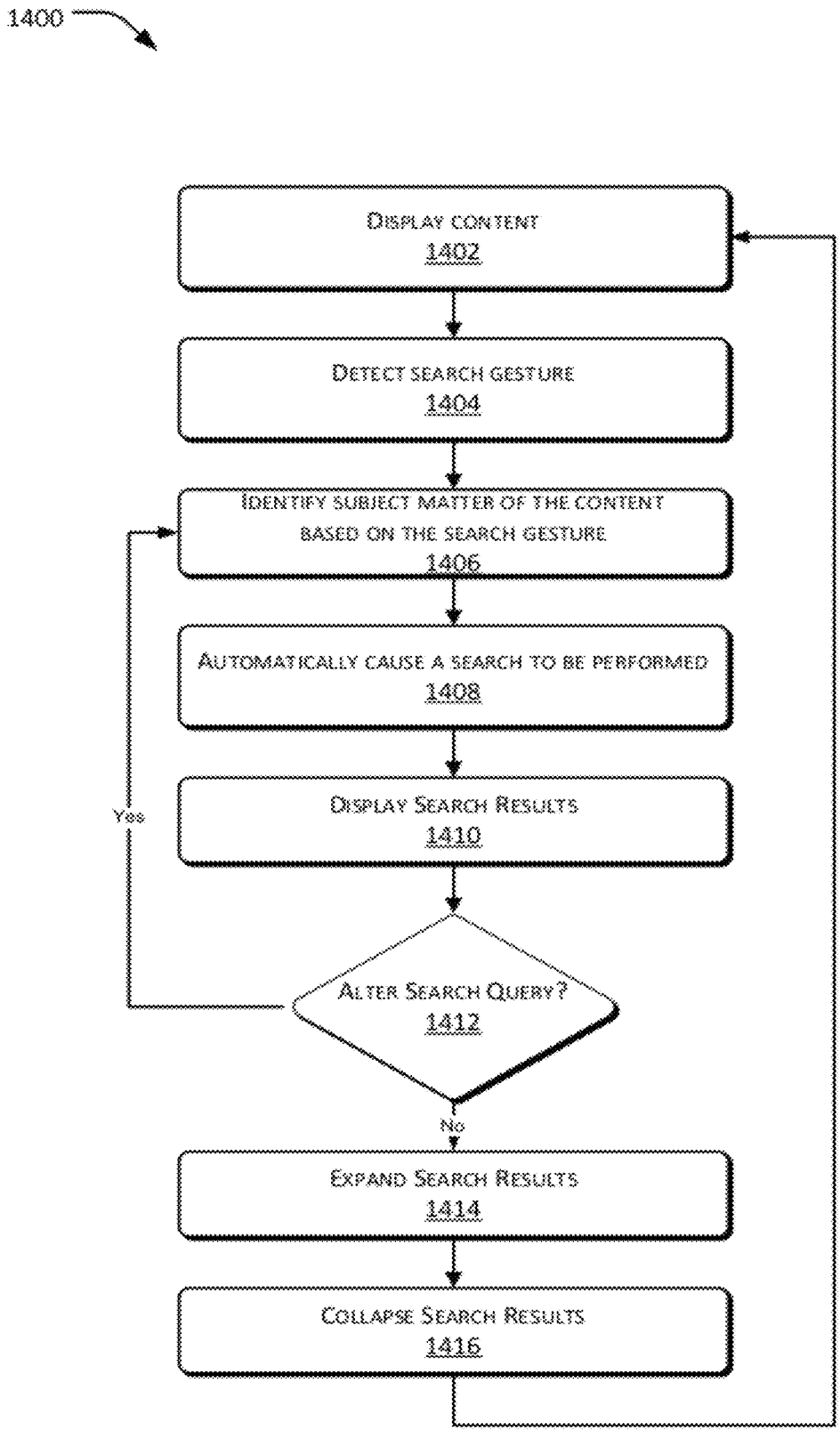
FIG. 14 illustrates a second example method of performing a search based on a search gesture.

FIG. 14 illustrates a second exemplary method 1400 of performing a search based upon a gesture. The method 1400 is described in the context of the example client device 104 for ease of illustration, but is not limited to being performed using such a client device.

At block 1402, content is consumed by the client device 104. By way of example and not limitation, content may be displayed on a display, such as display 200 of the client device 104. The content may be displayed within an application, such as a web browser, email client, or any other application on the client device 104. Additionally or alternatively, content such as a video or an audio may be played by a media player of the client device 104. The content may include text, an image, a picture, a visual representation of audio content, and/or video.

At block 1404, a search gesture is detected. The search gesture may be detected by, for example, a motion detection module (not shown) of the client device 104 or any combination of one or more gesture detection methods described in the foregoing descriptions above. Additionally or alternatively, the search gesture may include a motion of the client device 104 itself. The search gesture of the client device 104 may be detected by an accelerometer, an attitude sensor, a compass or any device that may determine motion including, but not limited to, direction, position, speed and/or acceleration of the client device 104.

At block 1406, one or more subject matters of the consumed content (such as the displayed content) defined by the search gesture are identified. The search gesture may indicate one or more subject matters in all or part of the displayed content, which are then identified by the client device 104. Additionally, the client device 104 may further identify context information that may provide signals as to a context in which the one or more subject matters are presented.

At block 1408, a search may be automatically caused to be performed based at least in part on the identified one or more subject matters in response to completion of the search gesture. In one embodiment, a search query may be sent to a remote search engine, which is separate the client device 104 of the user. Additionally or alternatively, the search may be performed locally in the client device 104.

At block 1410, search results are displayed on the display of the client device 104.

At block 1412, the client device 104 determines if the search query should be altered based on, for example, a resizing gesture such as that shown in FIG. 4, a relocation gesture such as that shown in FIG. 5, a subsequent gesture such as that shown in FIG. 6, selection of a search entity as shown in FIG. 9, voice input and/or eye tracking data such as that shown in FIG. 10, or any other inputs indicating that the search query should be altered. If the search query is to be altered, the method 1400 returns to block 1406 to reformulate the search query in accordance with the alteration.

If the search query is not to be altered, the method 1400 continues to block 1414, at which the client device 104 receives an expansion gesture, such as that shown in FIG. 7, and displays expanded search results. At block 1416, the client device receives a hide or collapse gesture, such as that shown in FIG. 11, and hides or collapses the search results, which effectively returns the method 1400 to block 1402 to again display the original content of the application. Thus, the user is able to search content from within an application, without interrupting the user's workflow.

Any of the acts of any of the methods described herein may be implemented at least partially by a processor or other electronic device based on instructions stored on one or more computer-readable media.

CONCLUSION

Although the invention has been described in language specific to structural features and/or methodological acts, it is to be understood that the invention is not necessarily limited to the specific features or acts described. Rather, the specific features and acts are disclosed as exemplary forms of implementing the invention.

What is claimed is:

1. A method of conducting a search, the method comprising:
　under control of one or more processors configured with computer-executable instructions:
　　detecting a gesture which defines a region of displayed content, wherein the region of displayed content corresponds to a first content format;
　　formulating multiple search queries corresponding to multiple content formats including the first content format, the multiple search queries based at least in part on the region of displayed content defined by the gesture and context information providing signals usable to improve relevance of one or more search results;
　　presenting the multiple search queries available to conduct a search, in response to detecting the gesture;
　　receiving an indication of a user selection of a search query from among the multiple search queries, the search query to perform the search corresponding to the respective content format using content from the region of displayed content; and
　　causing the search to be performed using the search query in response to receiving the indication of the user selection of the search query from among the multiple search queries.

2. The method of claim 1, the gesture comprising an eye movement and wherein detecting the gesture comprises detecting the eye movement using an image capture device.

3. The method of claim 1, wherein the gesture further comprises a substantially circular motion that bounds or substantially bounds the region of displayed content.

4. The method of claim 1, further comprising displaying a representation of the region of displayed content defined by the gesture on the displayed content.

5. The method of claim 4, wherein the representation of the region of displayed content comprises a line enclosing the region of displayed content, a highlighting view of the region of displayed content, and/or a magnifying lens view of the region of displayed content.

6. The method of claim 4, further comprising receiving a subsequent gesture in relation to the representation of the region of displayed content, and altering a scope of the search in response to receiving the subsequent gesture.

7. The method of claim 4, further comprising receiving a resizing gesture to resize the representation of the region of displayed content, and reformulating the search query based on the resized region of displayed content.

8. The method of claim 4, further comprising receiving a relocation gesture to relocate the representation of the region of displayed content to include other content, and reformulating the search query based the relocated region of content.

9. The method of claim 1, further comprising receiving a voice input, and refining the search query based on the voice input.

10. The method of claim 1, further comprising presenting one or more search results of the search by overlaying the one or more search results on the displayed content.

11. The method of claim 10, further comprising expanding a size of the one or more search results in response to receiving an expand gesture.

12. The method of claim 11, further comprising collapsing or hiding the one or more search results in response to a collapse gesture.

13. The method of claim 11, further comprising:
　presenting one or more search entities along with the one or more search results;
　receiving one or more selections of the one or more of the search entities; and
　refining the search query based on the one or more selections of the one or more of the search entities.

14. The method of claim 1; wherein the context information comprises at least one of:
　content proximate to the region of displayed content;
　a paragraph having a portion thereof within the region of displayed content;
　a sentence having a portion thereof within the region of displayed content;
　a title of a document having a portion of the document within the region of displayed content;
　a uniform resource locator where the displayed content is located;
　an application identifier of an application used to display the displayed content; or
　metadata associated with the displayed content.

15. The method of claim 1, wherein detecting the gesture comprises:
　determining that a user is inputting a gesture; and
　determining based on characteristics of the gesture that the gesture is a gesture usable to initiate the search and is not a gesture usable to pan or scroll the displayed content.

16. The method of claim 1, further comprising prior to detecting the gesture, receiving a command indicating that the gesture is imminent, wherein the command comprises a touch and hold of a screen of a device that displays the displayed content or a touch input in a specified location of the screen of the device.

17. The method of claim 1, wherein causing the search to be performed comprises sending the search query to a remote search engine and/or performing the search locally.

18. The method of claim 1; further comprising discriminating the gesture from other types of gestures based on a curvature of the gesture, a speed at which the gesture is entered or context information.

19. The method of claim 1, wherein the presenting of the multiple search queries accompanies visual feedback that indicates a size and shape of the defined region of displayed content.

20. The method of claim 1, the instructions further including:
　receiving an updated indication of a user selection of an update to the search query, to refine the search query.

21. One or more computer storage media storing instructions that, when executed by a processor, configure the processor to perform acts comprising:
    detecting a gesture;
    determining that the detected gesture is a gesture related to a search for information associated with a region of displayed content defined by the gesture, the determining comprising discriminating the gesture from other types of gestures based on a curvature of the detected gesture or a speed at which the detected gesture is entered, wherein the region of displayed content corresponds to a first content format;
    formulating multiple search queries corresponding to multiple content formats including the first content format, the multiple search queries based at least on the region of displayed content defined by the gesture and context information providing signals usable to improve relevance of one or more search results;
    presenting the multiple search queries as available to conduct the search, in response to detecting the gesture;
    receiving an indication of a user selection of a search query from among the multiple search queries, the search query to perform the search corresponding to the respective content format using content from the region of displayed content; and
    causing the search to be performed using the search query in response to receiving the indication of the user selection of the search query from among the multiple search queries.

22. The one or more computer storage media of claim 21, the acts further comprising displaying a representation of the region of displayed content defined by the gesture on the displayed content, the representation of the region of displayed content comprising a line enclosing the region of displayed content, a highlighting view of the region of displayed content, and/or a magnifying lens view of the region of displayed content.

23. The one or more computer storage media of claim 22, the acts further comprising receiving a subsequent gesture in relation to the representation of the region of displayed content, and altering a scope of the search in response to receiving the subsequent gesture.

24. The one or more computer storage media of claim 21, the acts further comprising receiving a voice input and/or eye tracking data, and refining the search query based on the voice input and/or the eye tracking data.

25. The one or more computer storage media of claim 21, the context information comprising at least one of:
    content proximate to the region of displayed content;
    a paragraph having a portion thereof within the region of displayed content;
    a sentence having a portion thereof within the region of displayed content;
    a title of a document having a portion of the document within the region of content;
    a uniform resource locator where the displayed content is located;
    an application identifier of an application used to display the displayed content; or
    metadata associated with the displayed content.

26. A system comprising:
    one or more processors;
    memory;
    a gesture detection module stored in the memory and executable by the one or more processors to detect a search gesture which defines a region of displayed content that is used for performing a search, wherein the region of displayed content corresponds to a first content format; and
    a content analysis module stored in the memory and executable by the one or more processors to:
        identify subject matter of the displayed content;
        identify context information providing signals as to a context n which the identified subject matter is presented;
        formulate multiple search queries corresponding to multiple content formats including the first content format based on the subject matter and context information;
        present the multiple search queries as available to conduct a search, in response to detecting the search gesture;
        receive an indication of a user selection of a search query from among the multiple search queries, the search query to perform the search corresponding to the respective content format using content from the region of displayed content; and
        cause the search to be performed based at least in part on the identified subject matter and the identified context information, in response to receiving the indication of the user selection of the search query from among the multiple search queries.

27. The system of claim 26, wherein the context information comprises:
    content proximate to the region of displayed content;
    a paragraph having a portion thereof within the region of displayed content;
    a sentence having a portion thereof within the region of displayed content;
    a title of a document having a portion of the document within the region of displayed content;
    a uniform resource locator where the displayed content is located;
    an application identifier of an application used to display the displayed content; and/or
    metadata associated with the displayed content.

28. The system of claim 26, wherein the content analysis module causes the search to be performed by sending a search query to a remote search engine and/or performing the search locally.

29. The system of claim 26, the search gesture comprising an eye movement and wherein to detect the search gesture comprises detecting the eye movement using an image capture device.

30. The system of claim 29, further comprising prior to detecting the eye movement, the gesture detection module further receives a command indicating that the eye movement is imminent, wherein the command comprises a touch and hold of a screen of a device that displays the displayed content or a touch input in a specified location of the screen of the device that displays the displayed content.

31. The system of claim 30, wherein the specified location comprises one of bottom corners of the screen of the device.

32. The system of claim 30, wherein the touch and hold of the screen of the device is maintained for a predetermined period of time.

33. A client device comprising:
    one or more processors;
    memory;
    a display;
    a gesture detection module stored in the memory and executable by the one or more processors to:

detect a predefined motion of the client device;
receive a search gesture that defines a region of interest within content that is consumed by the client device, wherein the region of interest corresponds to a first content format; and
formulate multiple search queries corresponding to multiple content formats including the first content format, the multiple search queries based at least in part on data included in the defined region of interest; and
a content analysis module stored in the memory and executable by the one or more processors to cause a search for information of at least a part of content that is presented by the display of the client device in response to the detecting of the predefined motion of the client device, the content analysis module further executable by the one or more processors to:
present the multiple search queries as available to conduct a search, in response to detection of the predefined motion of the client device;
receive an indication of a user selection of a search query from among the multiple search queries, the search query to perform the search corresponding to the respective content format using the at least part of the content that is presented by the display of the client device; and
cause the search to be performed, in response to receiving the indication of the user selection of the search query from among the multiple search queries.

34. The client device of claim 33, wherein the display further displays search results for presentation to a user of the client device.

35. The client device of claim 34, wherein the gesture detection module further detects a gaze of a user at one or more entities presented on the display of the client device; and the content analysis module further generates eye tracking data based at least in part on the detected gaze and refines the search results based at least in part on the generated eye tracking data.

* * * * *